United States Patent
Shirota et al.

(10) Patent No.: US 9,417,769 B2
(45) Date of Patent: Aug. 16, 2016

(54) CONTROL DEVICE, DISPLAY DEVICE, CONTROL METHOD AND PROGRAM PRODUCT

(71) Applicant: KABUSHIKI KAISHA TOSHIBA, Minato-ku, Tokyo (JP)

(72) Inventors: Yusuke Shirota, Kanagawa (JP); Tatsunori Kanai, Kanagawa (JP); Satoshi Shirai, Kanagawa (JP); Tetsuro Kimura, Tokyo (JP); Koichi Fujisaki, Kanagawa (JP); Junichi Segawa, Kanagawa (JP); Masaya Tarui, Kanagawa (JP); Akihiro Shibata, Tokyo (JP); Shiyo Yoshimura, Kanagawa (JP); Hiroyoshi Haruki, Kanagawa (JP)

(73) Assignee: KABUSHIKI KAISHA TOSHIBA, Tokyo (JP)

(*) Notice: Subject to any disclaimer, the term of this patent is extended or adjusted under 35 U.S.C. 154(b) by 36 days.

(21) Appl. No.: 14/483,362

(22) Filed: Sep. 11, 2014

(65) Prior Publication Data

US 2015/0084892 A1    Mar. 26, 2015

(30) Foreign Application Priority Data

Sep. 24, 2013   (JP) ................ 2013-196962

(51) Int. Cl.
*G06F 3/0483* (2013.01)
*G09G 5/34* (2006.01)
*G09G 3/34* (2006.01)

(52) U.S. Cl.
CPC ............. *G06F 3/0483* (2013.01); *G09G 5/34* (2013.01); *G09G 3/3453* (2013.01); *G09G 2310/04* (2013.01); *G09G 2330/021* (2013.01); *G09G 2380/14* (2013.01)

(58) Field of Classification Search
CPC ................ G09G 2380/14; G09G 2310/04
See application file for complete search history.

(56) References Cited

U.S. PATENT DOCUMENTS

2012/0105478 A1* 5/2012 Soohoo .................. G09G 3/344
345/635

FOREIGN PATENT DOCUMENTS

JP    2012-053220    3/2012

OTHER PUBLICATIONS

Electrophoretic Display Controller (EPDC); i.MX50 Multimedia Applications Processor Reference Manual, Oct. 2011; pp. 1153-1226; Ch. 24; Rev. 1; Freescale Semiconductor, Inc.
Taiwanese Office Action for Taiwanese Patent Application No. 103131980 mailed on Dec. 15, 2015.

* cited by examiner

*Primary Examiner* — Gerald Johnson
(74) *Attorney, Agent, or Firm* — Amin, Turocy & Watson LLP

(57) ABSTRACT

A control device according to embodiments may control update of a target region in an electronic paper. The device may comprise a divider unit, a manager unit and an update instruction unit. The divider unit may be configured to divide the target region into a plurality of sub-regions. The manager unit may be configured to configure an update start timing of each sub-region so that flashings occurring at updating of the sub-regions appear at different timings. The update instruction unit may be configured to instruct to execute an update process of each sub-region according to the update start timings.

12 Claims, 29 Drawing Sheets

CONTROL DEVICE, DISPLAY DEVICE, CONTROL METHOD AND PROGRAM PRODUCT

CROSS-REFERENCE TO RELATED APPLICATION(S)

This application is based upon and claims the benefit of priority from the Japanese Patent Application No. 2013-196962, filed on Sep. 24, 2013; the entire contents of which are incorporated herein by reference.

FIELD

Embodiments described herein relate generally to a control device, a display device, a control method and a program product.

BACKGROUND

Conventionally, for a data processing device such as a portable data processing terminal including a slate terminal, a tablet terminal, an electronic book terminal, a medical terminal, an electronic medical chart, or the like, a wearable data processing terminal including a bracelet-type, a wristwatch-type, a glasses-type, or the like, an electronic POP (point of purchase advertising), an ESL (electronic shelf label), an electronic poster and a digital signage, an electronic newspaper, a sheet-shape display, a compact server, a sensor node, or the like, improvement of power efficiency is an important technical issue. Especially, for a data processing device with an energy harvesting technology such as a solar cell, suppression of unnecessary power consumption is critically important technical issue.

For a display device of such data processing device, for instance, a display with low-power consumption such as a non-volatile electronic paper which consumes electric power during updating display can be used. When using such display device, in a waiting period such as a term during a user browses the display, a displayed content does not change, or the like, it is possible to suppress the power consumption.

However, an electronic paper has some technical issues. One of them is that an update time is long as compared to a LCD (liquid crystal display), or the like. The other one is that update process may induce phenomenon so called as flashing.

DETAILED DESCRIPTION

Exemplary embodiments of a control device, a display device, a control method and a program product will be explained below in detail with reference to the accompanying drawings.

In the following embodiments, a control device, a display device, a control method and a program product capable of improving user experience by realizing effect through use of flashing.

First Embodiment

Figure 1:
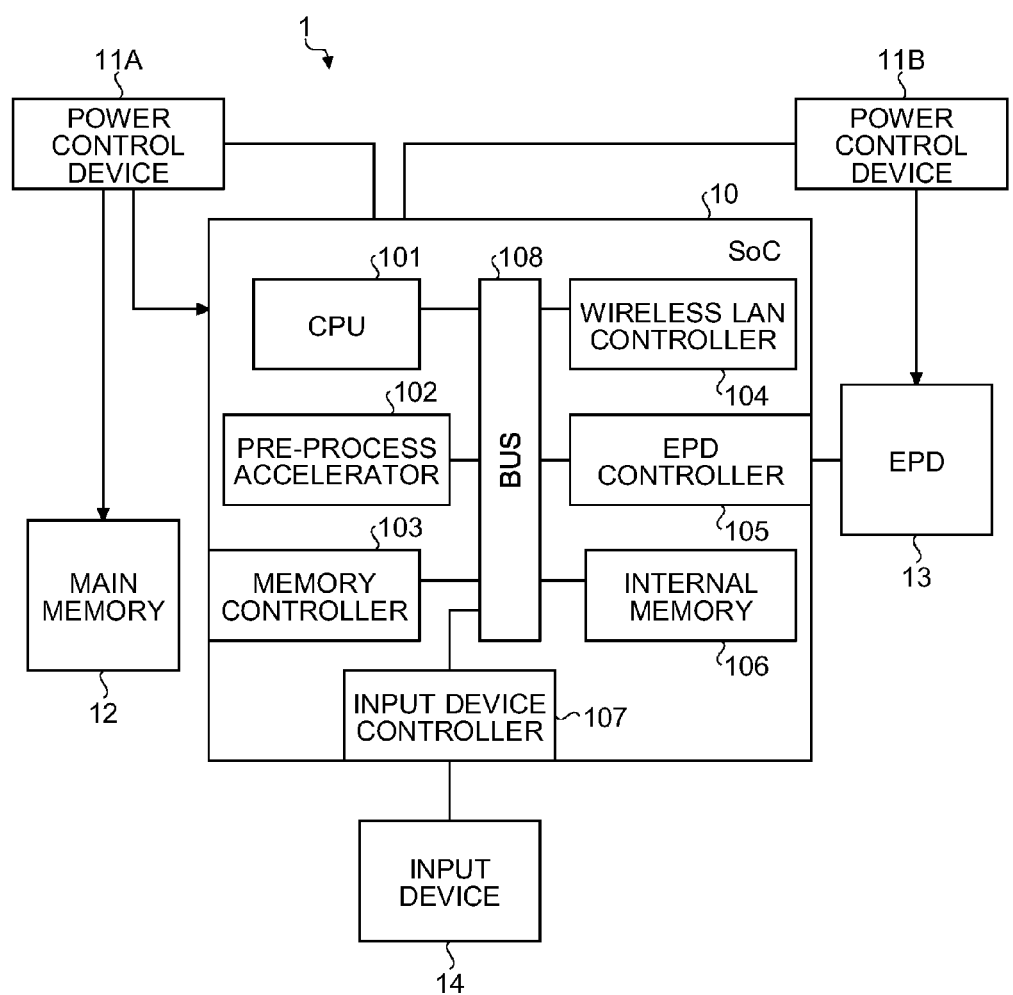
FIG. 1 is an illustration showing an outline structure example of a data processing device according to a first embodiment.

Firstly, a control device, a display device, a control method and a program product according to a first embodiment will be described in detail with accompanying drawings. FIG. 1 is a block diagram showing an outline structure of a data processing device according to the first embodiment. As shown in FIG. 1, a data processing device 1 is constructed from a SoC 10, a main memory 12, a memory display device 13, power control devices 11A and 11B, and an input device 14.

The memory display device 13 may be an electronic paper display (EPD). In the following, a case where the display device 13 is an EPD will be explained as an example. As a display method of the EPD 13, various kinds of methods such as an electrophoretic display, a quick response liquid powder display, a cholesteric liquid crystal display, or the like, can be applied. As the EPD 13, various kinds of EPDs such as a black and white EPD, a grayscale EPD, a color EPD, or the like, can be applied.

The input device 14 may be a touch panel operating as a pointing device on a surface of the EPD 13. The data processing device 1 can have a keyboard, or the like, as the other input device 14.

The main memory 12 is a non-volatile memory such as a MRAM (magnetoresistive random access memory) with high power-saving, or the like. However, the main memory 12 can also be a volatile memory such as a DRAM (dynamic random access memory), or the like. On the main memory 12, data for updating (hereinafter referred to as update data) the EPD 13 is stored. On the main memory 12, EPD update control information necessary for updating the EPD 13, which is information about voltage applying including a voltage value for updating a state (grayscale value, or the like) of each pixel or a set of pixels of the EPD 13 into a desired state, a period of time for applying the voltage, and so forth, is also stored. The EPD update control information may be called as waveform.

The power control device 11 feeds the main memory 12 and the SoC 10, for instance. The power control device 11B feeds the EPD 13, for instance. The power control devices 11A and 11B may be PMICs (power management integrated circuit), or the like.

The data processing device 1 can have a solar cell and an accumulator such as a capacitor, and operate using power generated by the solar cell. In such case, a power control that during idle time, surplus power generated by the solar cell is accumulated in the accumulator, and during active time, when power generated amount of the solar cell is not sufficient, combination power of the solar cell and the accumulator is fed to each unit of the data processing device 1 from the PMIC, can be executed. In order to accumulate sufficient surplus power in the accumulator, aggressive power-saving is necessary. This is the same in the following embodiments.

The SoC 10 includes a CPU 101, a memory controller 103, an EPD controller 105, a pre-process accelerator 102 used for pre-process for the EPD 13, an internal memory 106, a communication interface such as a wireless LAN controller 104, and an input device controller 107; which are mutually connected with one another via a bus 108.

The SoC 10 has functions of a standard mode and a standby mode in which power consumption is lower than that in the standard mode. The standby mode can includes various kinds of standby modes of which power consumptions and necessary costs for returning to the standard mode differ from each other.

The pre-process accelerator 102 converts update data on the main memory 12 into data which is displayable on the EPD 13. Pre-process for the EPD 13 may include processing process of update data, selection process of EPD update control information, and so forth, for instance.

The processing process of update data is process for processing update data such as process of converting color image data into grayscale or black-and-white (binary) image data when using a grayscale EPD, process of inverting black-and-white image data, process of expanding or downscaling image data for fitting a display size of an EPD or a size of an update-target region when the EPD is to be partially updated, or the like. The pre-process can include process of creating update data using an accelerator in a GPU, or the like, a CPU, or the like, installed in the data processing device 1; the process being rendering process in PDF data or a web browser, or the like.

The selection process of EPD update control information is process of selecting EPD update control information used for updating based on feature such as the number of gradation of update data being an image, or the like, surrounding temperature of the data processing device 1, and so forth. The data processing device 1 can have a temperature sensor for detecting a surrounding temperature.

All or a part of the pre-process may be executed on the EPD controller 105. It is also possible to arrange such that a part or all of the pre-process is executed on the CPU 101.

The EPD controller 105 may use the main memory 12 as a working memory. In such case, the EPD controller 105 reads out pre-processed update data being output of the pre-process executed by the pre-process accelerator 102 and EPD update control information corresponding to information for selecting EPD update control information being another output of the pre-process from the main memory 12, and executes update process of the EPD 13.

The EPD control 105 can have a plurality of update engines (update modules) assigned on a device driver of the EPD controller 105, or the like. In such case, when actual regions to be updated on the EPD 13 does not overlap with each other, the EPD controller 105 can execute update process for a plurality of partial regions in parallel. Update process of each region in parallel updating is executed on each update engine installed in the EPD controller 105.

Figure 2:
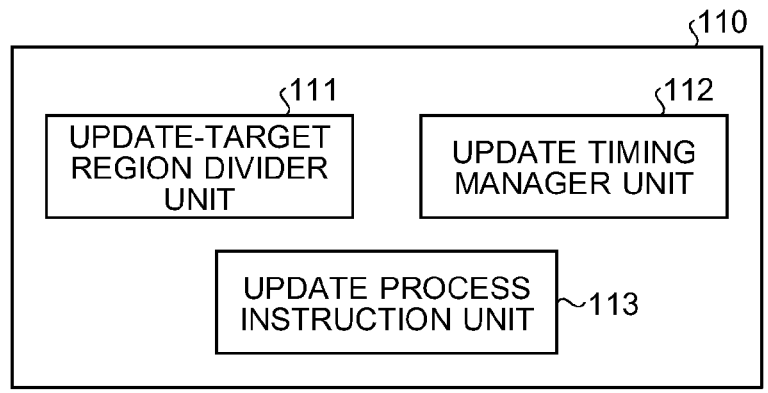
FIG. 2 is an illustration showing an outline structure example of an EPD update controller according to the first embodiment.

Next, an EPD update controller according to the first embodiment will be explained. FIG. 2 is a block diagram showing an outline structure example of an EPD update controller according to the first embodiment. The EPD update controller 110 is a partial function of the device driver of the EPD controller 105, or the like, and it is executed on an operating system (hereinafter referred to as OS) operating on the CPU 101. The EPD update controller 110 can also be a module in the EPD controller 105 or an application software.

Figure 3:
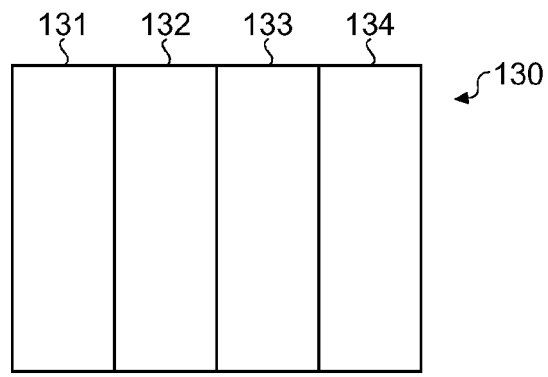
FIG. 3 is an illustration showing an example of a method of dividing an update-target region according to the first embodiment.

The EPD update controller 110 is constructed from an update-target region divider unit 111, an update timing manager unit 112 and an update process instruction unit 113. The EPD update controller 110 operates in response to requests from an application software, a middleware, an OS, or the like, operating on the data processing device 1. In particular, when the EPD update controller 110 receives one update request for updating an update-target region being whole or a part of the EPD 13, the update-target region divider unit 111 of the EPD update controller 110 divides the update-target region into a plurality of sub-regions. For example, when the update-target region is the whole screen of the EPD 13 and the update-target region is divided into a plurality of rectangular regions (four regions, for instance) in a lateral direction, as shown in FIG. 3, the update-target region divider unit 111 divides the update-target region 130 into a plurality of sub-regions 131 to 134 in a lateral direction. When the update-target region is a part of the EPD 13 and the update-target region is divided into a plurality of rectangular regions (four regions, for instance) in a lateral direction, as shown in FIG. 4, the update-target region divider unit 111 divides the update-target region 130P into a plurality of sub-regions 135 to 138 in the lateral direction.

Figure 4:
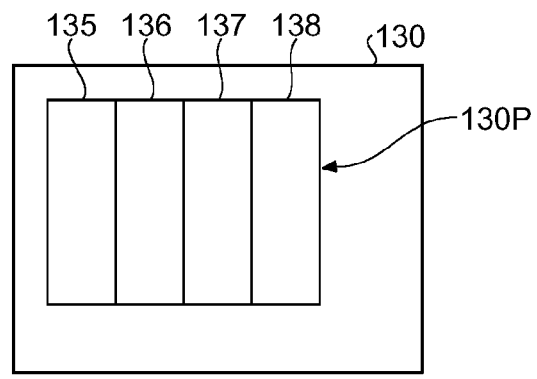
FIG. 4 is an illustration showing another example of a method of dividing an update-target region according to the first embodiment.

In the explanations of FIGS. 3, 4 and below, for the sake of clarification, the division number is defined as a comparatively small number "4". However, as long as the division number satisfies a constant such as being a number capable of simultaneous parallel update by the EPD 13 or the PED controller 105, it can be changed. The division number can be decided based on a division number specified by executing experimentations on some division numbers for observing the effect capable of making flashing seem as scrolling or flipping pages; the specified division number being capable of realizing the most smooth effect among the other tested division numbers. Such experimentations can be executed at the time of designing the device driver. At this time, an appropriate division number can be preset depending on the display size of the EPD 13.

The explanation is returned to FIG. 2. The update timing manager unit 112 manages start timing of each update process so that the update start timing of each sub-region is shifted to not overlap with the other ones. A sifted period depends on the performance and constraint of the PED 13, the EPD controller 105, the EPD update control information, and so forth, and it may be a short period that is about several milliseconds to several dozen milliseconds.

The update process instruction unit 113 instructs the EPD controller 105 to execute update process based on the update start timing shifted by the update timing manager unit 112. Update processes of the sub-regions instructed with shifts of the update start timings are executed by the EPD controller 105 in parallel. Because a time from the point the EPD controller 105 starts update process till flashing becomes visible for a user is almost constant, the user may observe flashings of the sub-regions with gaps depending on the shift of the update start timing. When a black-and-white electronic paper is used as the EPD 13, black flashing is occurred, and when a color electronic paper is used as the EPD 13, a color of flashing is not limited to black. Flashing may be an intermediate state or an overall adverse reaction being observable during displaying a desired color, and phenomenon of flashing may be different depending on a type of the EPD 13. For example, undesired color is displayed depending on a procedure of applying a voltage. This is the same in the following embodiments.

Figure 5:
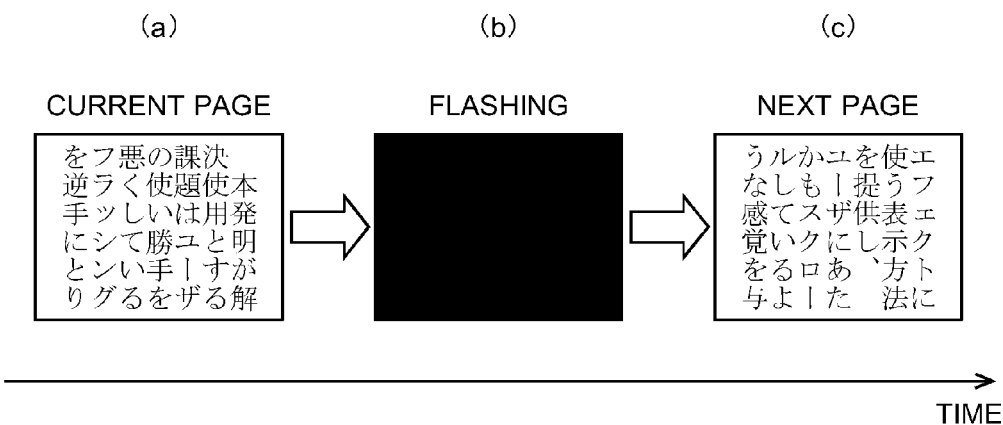
FIG. 5 is an illustration showing an example of flashing.
Figure 6:
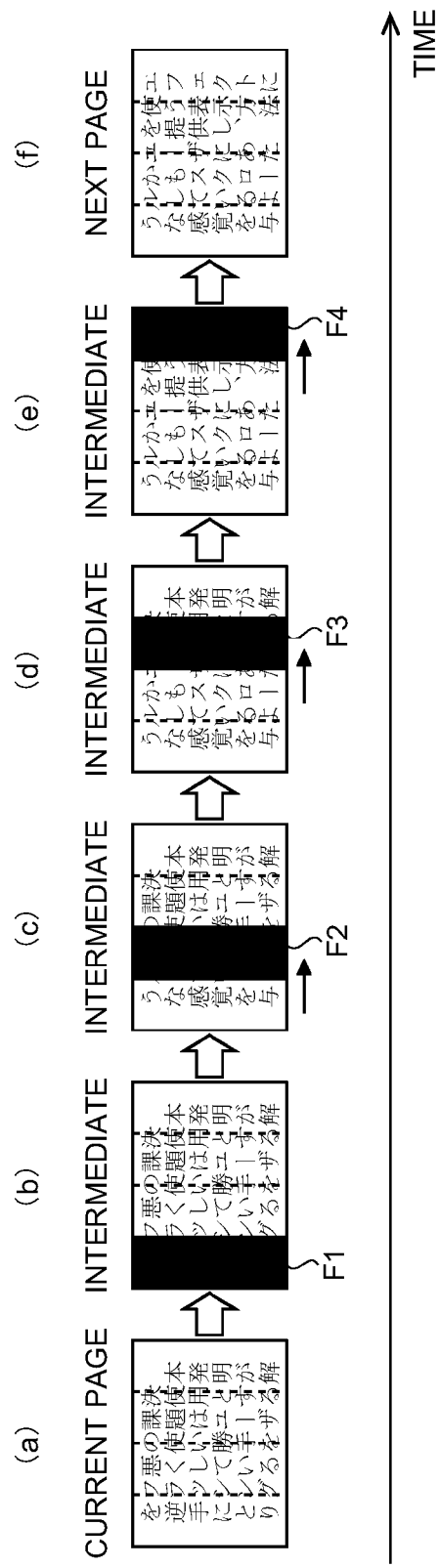
FIG. 6 is an illustration showing an example of display effect according to the first embodiment.

Next, an example of effect for display according to the first embodiment will be described in detail with accompanying drawings. FIG. 5 is a display transition diagram showing an example of flashing in the prior art. FIG. 6 is a display transition diagram showing an example of flashing according to the first embodiment. In the following, a case where a black-and-white electronic paper is used as the EPD 13 will be explained as an example.

As shown in FIG. 5, in the prior art in which an update-target region is not divided, when switching a screen from a page shown in (a) of FIG. 5 (hereinafter referred to as current page) to a next page shown in (c) of FIG. 5, as shown in (b) of FIG. 5, the whole update-target region becomes black temporarily due to flashing. This is ungainly for a user.

On the other hand, in a case where an update-target region is divided into a plurality of sub-regions in response to a single update request, and update processes of the sub-regions are executed with shifts of update start timings in order to shift timings of flashings in the sub-regions, when switching a screen from a current page shown in (a) of FIG. 6 to a next page shown in (f) of FIG. 6, as shown in (b) to (e) of FIG. 6, a user sees as through the flashing flows from left to right in a page. At a region where a black band formed by flashings F1 to F4 seems to flow, a next page is displayed. Thereby, because a user can feel that a page is scrolled or flipped, it is possible to resolve ungainliness caused by flashing in the prior art. Furthermore, by such effect, it is also possible to reduce a cenesthesis time for updating.

As a result of the shift of the update start timing by each sub-region, there is a case where a total update process time (a period of time from start of update process till release of update engine for reuse after finishing the update process) becomes long and power consumption increases depending on an elongated time. However, compared with a case where additional process for effect is added, it is possible to suppress influence of the increase of power consumption to extremely small. Therefore, by adding effect while suppressing increase of power consumption, it is possible to improve the user experience.

Figure 7:
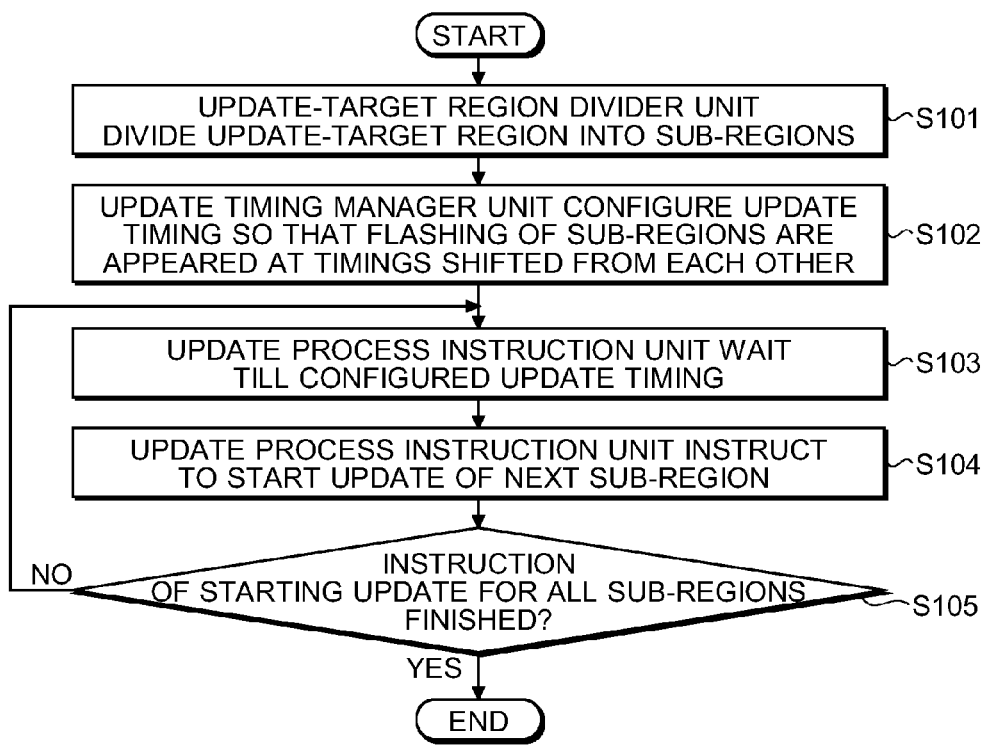
FIG. 7 is a flowchart showing an example of update operation according to the first embodiment.

Next, an update operation according to the first embodiment will be described in detail with accompanying drawings. FIG. 7 is a flowchart showing an example of update operation according to the first embodiment. In FIG. 7, an operation of the units in the EPD update controller 110 will be focused on.

An operation shown in FIG. 7 is started when update request is issued to the EPD update controller 110 from an application software, a middleware, an OS, or the like, for instance. The update request includes instruction for updating an update-target region in the EPD 13 using update data of the EPD 13 located on a frame buffer, or the like, on the main memory 12, for instance. This is the same in the following embodiments.

As shown in FIG. 7, when the EPD update controller 110 receives one update request for an update-target region in the EPD 13, the update-target region divider unit 111 of the EPD update controller 110 divides the update-target region into a plurality of sub-regions (step S101). Next, the update timing manager unit 112 configures an update start timing of each sub-region so that flashings of the sub-regions are displayed sequentially. On the other hand, the update process instruction unit 113 waits till the configured update start timing (step S103), and after that, when getting to the configured update start timing, the update process instruction unit 113 instructs the EPD controller 105 to start updating of an initial sub-region among remaining sub-regions (hereinafter referred to as next sub-region) (step S104). Here, it is assumed that an update order of the sub-regions is preset on the update timing manager unit 112. However, it is also possible that the update-target region divider unit 111 decides an update order of the sub-regions while dividing the update-target region.

After that, the update process instruction unit 113 confirms whether issuances of update start instructions for all the sub-regions are finished (step S105), and when the issuances are not finished (step S105; NO), the update process instruction unit 113 returns to step S103 in order to instruct to start updating of a next sub-region. On the other hand, when the issuances are finished (step S105; YES), the EPD update controller 110 finishes the operation.

In the operation shown in FIG. 7, although the update process instruction unit 113 waits issuance of instruction of starting update till the configured update start timing, it is also possible that a timer is set so that a task for instructing starting update is executed at a configured update start timing. This is the same in the following embodiments.

Figure 8:
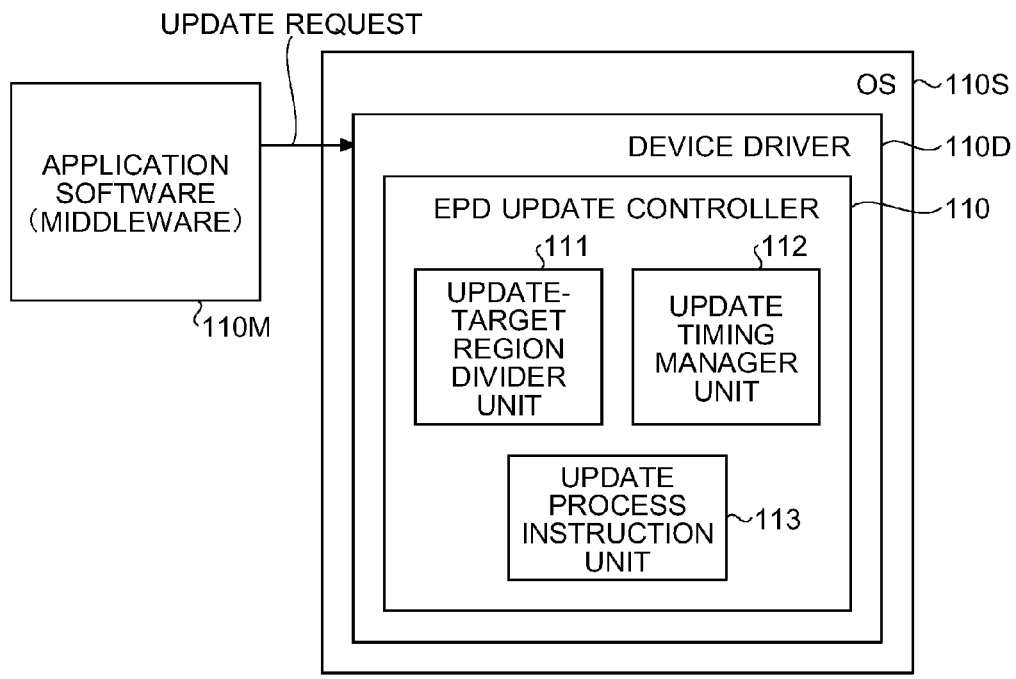
FIG. 8 is a relationship diagram of a device driver according to the first embodiment.
Figure 9:
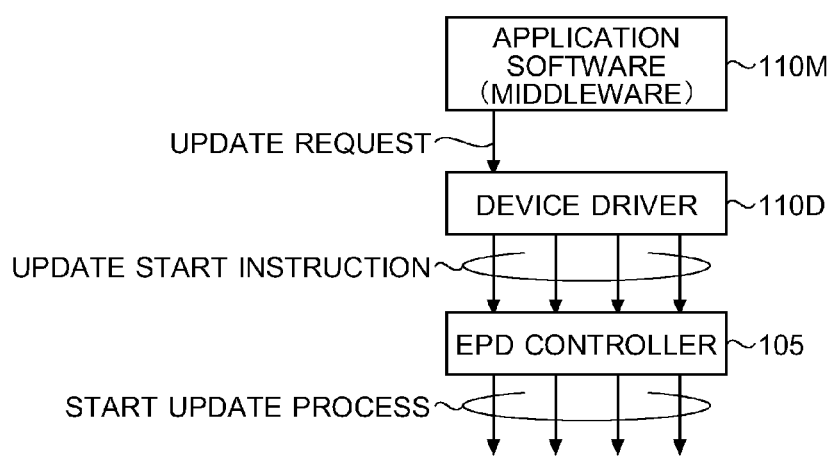
FIG. 9 is an illustration showing an operation example of the device driver according to the first embodiment.

Next, a relationship between an application software (or a middleware), a device driver and an EPD controller will be explained. FIG. 8 is a schematic diagram showing a relationship between an application software (or a middleware), a device driver and an EPD controller according to the first embodiment. FIG. 9 is a schematic diagram showing an operation example of a device driver and an EPD controller in response to update request from an application software (or a middleware).

As shown in FIG. 8, an application software (or a middleware) 110M and a OS 110S are executed on the CPU 101, respectively. A device driver 110D is located in the OS 110S, and the EPD update controller 110 is executed as a part of function of the device driver 110D.

In the structure shown in FIG. 8, one update request for an update-target region is transmitted from the application software (or the middleware) 110M to the device driver 110D. Then, as shown in FIGS. 8 and 9, the device driver 110D transmits update start instruction for every sub-regions being divided regions of the update-target region to the EPD controller 105. Accordingly, from the device driver 110D to the EPD controller 105, update start instructions of which number corresponds to the division number, i.e., the number of the sub-regions. In response to this, the EPD controller 105 starts update process of each sub-region at a timing of reception of each update start instruction.

Next, an operation timing of the EPD update controller 110 for realizing the effect according to the first embodiment will be described in detail with accompanying drawings. In the description, a case where the EPD controller 105 has four update engines A to D, an update-target region of the EPD 13 is divided into four sub-regions 131 to 134 or 135 to 138 as shown in FIG. 3 or 4, and the sub-regions are updated by the update engines A to D, respectively, is explained as an example. In the following, symbols of the sub-region are defined as a to d.

Figure 10:
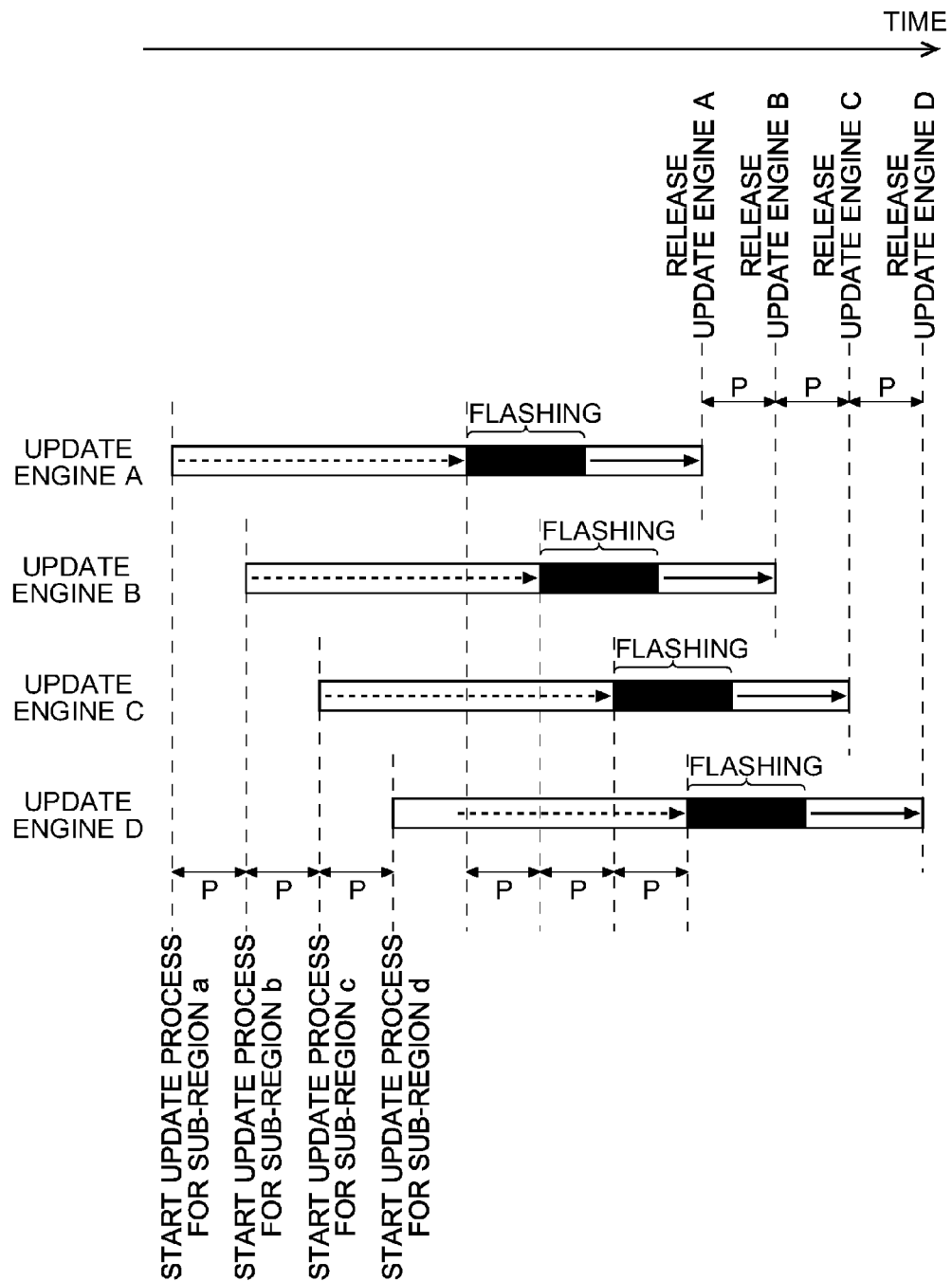
FIG. 10 is an illustration showing an example of operation timing according to the first embodiment.

FIG. 10 is a timing chart showing an example of operation timing of the EPD update controller for realizing the effect according to the first embodiment. As shown in FIG. 10, when update start instructions are inputted from the device controller 110D to the EPD controller 105 at timings shifted by time interval P, the update engines A to D start update processes at timings shifted by the time interval P. Specifically, firstly, update process of the sup-region a is started. When the update process of the sub-region a is started, over time indicated by a dashed allow from the update start point, the sub-region a gradually changes from a displayed image of a current page to black being flashing. In a state after the sub-region a is completely changed to flashing, the sub-region a is displayed as black. After that, over time indicated by a solid arrow after the flashing, the sub-region a gradually changes to a next page, and when the update process is finished, the update engine A handling the update process of the sub-region a is released. For the other sub-regions b to d, update processes are started at the timings shifted by the time interval P, respectively, and after that, each sub-region b to d is updated by the same procedure as that of the update engine A. Thereby, because flashings are sequentially appeared on the sub-regions a to d at the timings shifted by the time interval P, it is possible to realize the effect capable of making flashing seem as scrolling or flipping pages. In FIG. 10, although appearance terms of the flashings of the sub-regions are overlapped, it is also possible that the appearance terms of the flashings are not overlapped.

As described above, the first embodiment has the structure that the update-target region is divided into the plurality of the sub-regions at the updating of the EPD 13 and the flashings are sequentially appeared on the sub-regions at the shifted timings. In other words, according to the first embodiment, the data processing device (or a display device) executing update of an EPD has a structure for executing update processes so that an appearance timing of flashing of a first region on the EPD 13 differs from an appearance timing of flashing of a second region not overlapping the first region. Thereby, it is possible to provide the effect capable of making flashing seem as scrolling or flipping pages for a user.

Furthermore, because the first embodiment has the structure that the update-target region is updated while being divided into the sub-regions, there is no necessity of adding additional process for the effect. Therefore, it is possible to provide the display effect with suppressing increase of the power consumption, and thereby, it is possible to improve the user experience.

That is, as described above, there are the technical issues of the conventional electronic paper such that a time for update process is long as compared to a LCD, or the like, and update process induces phenomenon so called as flashing.

The former, which is slowness of update process, is a factor of making a display method such as scrolling commonly used for browsing illustrations, texts, maps, or the like, on the display such as a LCD difficult on an electronic paper.

Because the latter, which is update process inducing flashing, may make a user easily feel slowness of update process in addition to making the user feel ungainliness, it significantly influences on reduction of response and reduction of user experience.

In an application for presentation, a viewer for images and texts, or the like, being commonly used for a display such as the LCD, it is possible to show a motion by adding various kinds of effects and animations when a screen is switched. On the other hand, in an electronic book application, or the like, it is possible to give a user the sense that the user reads a paper book by adding an animation for showing an effect of flipping pages of an actual paper book. However, because of reasons that update of the electronic paper being slow, and so forth, it is difficult to apply these animations and effects to a data processing device with the conventional electronic paper.

Animations, scrolling displays, and so forth, for improving the usability in the LCD are additional processes for improving the usability aside from minimum required processes for displaying pages. Because processes for adding these effects is accompanied with image processing, and so forth, requiring large arithmetic processing heavily using a SIMD (single instruction multiple data) unit, a GPU (graphic processing unit), an accelerator, and so forth, in a CPU, it requires large power consumption.

On the other hand, in the first embodiment, afterimages so called as flashing which is a factor of reducing the user experience such as usability are used for display effects. Thereby, according to the first embodiment, it is possible to give a user the sense of scrolling or flipping pages. As a result, it is possible to improve the user experience at a time for switching pages, which is the technical issue of the electronic paper.

Furthermore, because the effect capable of making flashing seem as scrolling or flipping pages can be realized by dividing the update-target region into the sub-regions and sequentially updating the sub-regions, there is no necessity of adding additional process for the effect. Therefore, it is possible to provide the display effect with suppressing increase of the power consumption, and thereby, it is possible to improve the user experience.

The division method of sub-regions and the update order thereof are not limited to the configuration shown in FIG. 6, in which the update-target region is equally divided in the lateral direction and the sub-regions are updated in order from left to right. For example, a configuration with the same division method as in FIG. 6 and an update order from right to left, a configuration in that the update-target region is divided in the longitudinal direction and the sub-regions are updated in order from top to bottom, a configuration in that the update-target region is divided in the longitudinal direction and the sub-regions are updated in order from bottom to top, or the like, can be applied. Furthermore, the sub-regions can be updated in arbitrary order. Moreover, each sub-region is not limited to the rectangular region, and it can be an arbitrary shape. This is the same in the following embodiments.

For aggressive power-saving, reduction of power consumption during idle time except for during updating the EPD is effective. For example, in a case where the main memory 12 is a non-volatile memory such as a MRAM, it is preferred to reduce the power consumption of the main memory 12 by cutting power supply to the main memory 12 from the power control device 11A after update processes for all of the sub-regions are instructed, after update process of a last sub-region is finished by the EPD controller 105, or directly when the data processing device transits to an idle state. In a case where the main memory 12 is a volatile memory such as a DRAM, or the like, instead of cutting power supply to the main memory 12, it is preferred that a DRAM controller is configured to a power-saving mode capable of maintaining data such as a self-refresh mode in the DRAM. Furthermore, it is also preferred that interruption of power supply to the EPD 13 is instructed to the power control device 11B and the power control device 11B is also configured to a low-power mode. Moreover, a method of executing power gating of modules such as the EPD controller 110 in the SoC 10, a method of cutting clock supply, a method of using a standby mode with low power consumption in the SoC 10, or the like, is also effective. These are the same in the following embodiments.

The EPD controller 105 in the data processing device 1 can have a working buffer located outside the SoC 10, a dedicated memory storing a waveform, etc., and so forth. The EPD controller 105 can have a structure for being controlled by a microcontroller, or the like, with power consumption lower than that of the SoC 10. These are the same in the following embodiments.

In the first embodiment, it is not limited to the structure that the data processing device 1 has the input device 14 in addition to the EPD 13. This is the same in the following embodiment.

Second Embodiment

Next, a control device, a display device, a control method and a program product according to a second embodiment will be described in detail with accompanying drawings. In the second embodiment, pre-process is divided for each sub-region, and divide pre-processes are pipeline-processed for update process. Thereby, it is possible to improve the user experience by the effect using flashing according to the first embodiment without elongating the total update process time. The pre-process may be the rendering process and EPD-unique pre-processes which are executed on the pre-process accelerator 102, a GPU, a CPU, the EPD controller 105, or the like.

Figure 11:
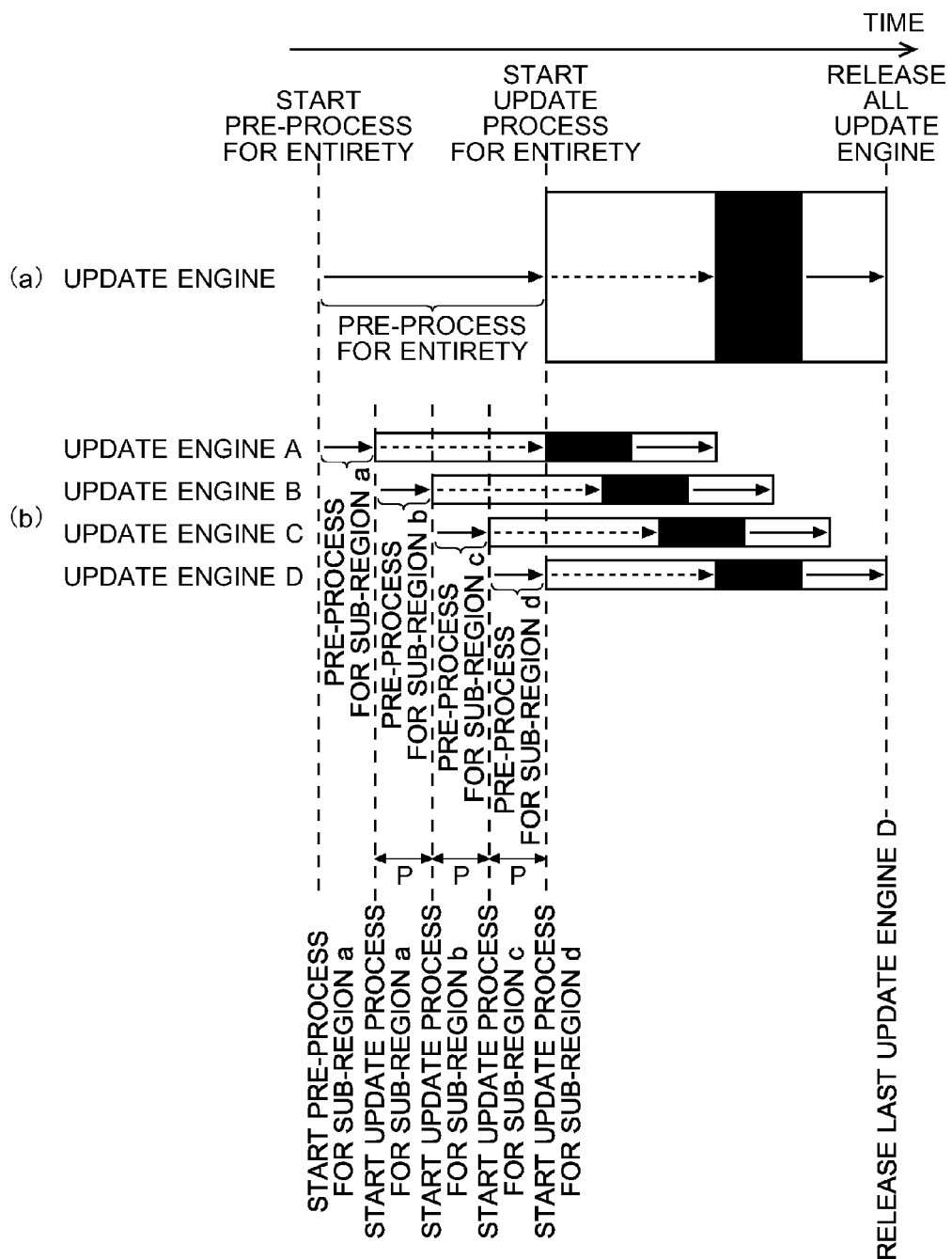
FIG. 11 is an illustration showing an example of operation timing according to a second embodiment.

FIG. 11 shows examples of operation timings of normal pre-process and update process and operation timings of pre-process and update process according to the second embodiment. In update process according to the second embodiment shown in FIG. 11, as the case explained using FIG. 10 in the first embodiment, a case where an update-target region is divided into four sub-regions a to d is explained as an example.

In normal update process without dividing the update-target region, as shown in (a) of FIG. 11, pre-process for update data is executed for whole the update-target region at once. Update process for the EPD 13 is executed the whole update-target region after finishing the pre-process.

On the other hand, in a case where pre-process and update process are divided depending on the number of the sub-regions, as shown in (b) of FIG. 11, firstly, pre-process for the sub-region a is executed. After the pre-process for the sub-region a is finished, it becomes possible to start update process of the sub-region a and pre-process for a next sub-region b without delay. Each pre-process for the other sub-regions b to d is started after pre-process for a previous sub-region is finished, respectively. Each update process for the other sub-region b to d is started at a timing delayed from an update start timing of update process of a previous sub-region by the time interval P, respectively, and then, each sub-region b to d is updated by the same procedure as the update engine A. According to such procedure, it is possible to suppress the total update process time of the whole update-target region to the same degree as that of the normal update process shown in (a) of FIG. 11. As a result, it is possible to provide the same effect as the first embodiment to a user with the same power consumption as that of the normal update process.

In the update process shown in (b) of FIG. 11 according to the second embodiment, because the update process of the initial sub-region a is started sooner, a timing of appearance of initial flashing is earlier than that in the normal update process shown in (a) of FIG. 11. Thereby, it is possible to improve responsibility of the data processing device with respect to a use.

Next, a structure of the data processing unit according to the second embodiment will be explained. The data processing device according to the second embodiment, can have the same structure as the data processing device 1 explained using FIG. 1 in the first embodiment. However, the EPD update controller 110 according to the second embodiment is replaced with an EPD update controller 210 shown in FIG. 12.

Figure 12:
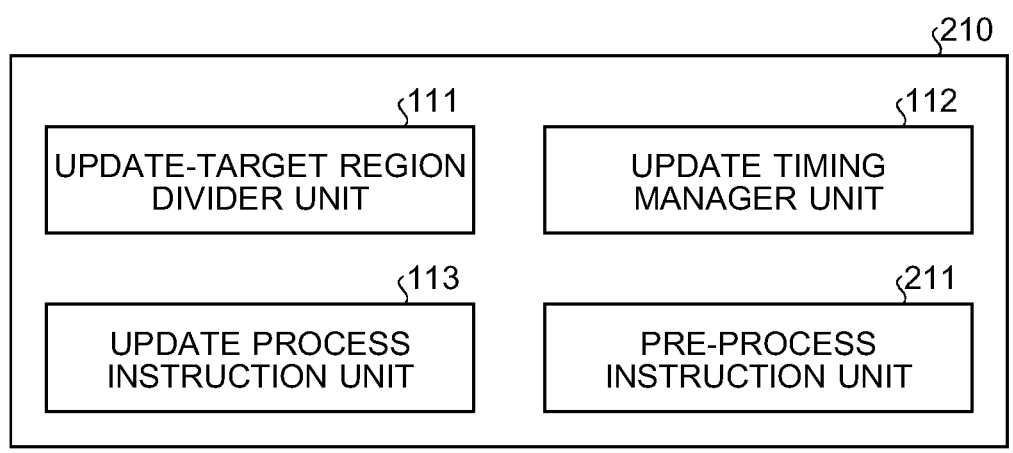
FIG. 12 is an illustration showing an outline structure example of an EPD update controller according to the second embodiment.

As shown in FIG. 12, the EPD update controller 210 has the same structure as the EPD update controller 110 shown in FIG. 2 and further has a pre-process instruction unit 211. When the EPD update controller 210 receives update request from an application software, a middleware, a OS, or the like, executing on the data processing device, the update-target region divider unit 111 of the EPD update controller 210 divides an update-target region into a plurality of sub-regions. The pre-process instruction unit 111 instructs a GPU and the pre-process accelerator 102 to execute pre-process of each sub-region in order of update. The update timing manager unit 112 manages start timing of each update process so that the update start timing of each sub-region is shifted to not overlap with the other ones.

The update process instruction unit 113 instructs the EPD controller 105 to execute update process based on the update start timing shifted by the update timing manager unit 112.

Next, an example of update operation according to the second embodiment will be explained with FIG. 13. In an operation flow shown in FIG. 13, the same reference numbers are applied to the same steps in FIG. 7, and the redundant explanations will be omitted.

Figure 13:
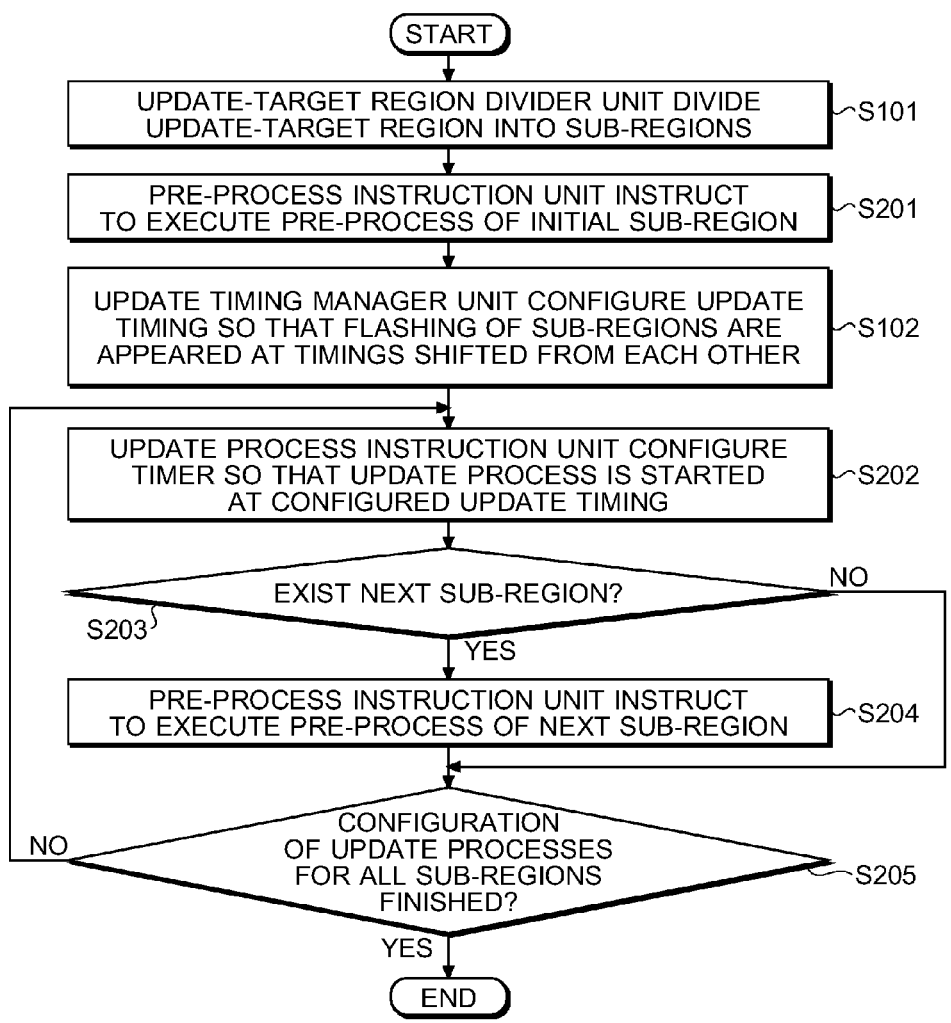
FIG. 13 is a flowchart showing an example of update operation according to the second embodiment.

As the operation shown in FIG. 7, the operation shown in FIG. 13 is started when update request is issued to the EPD update controller 110 from an application software, a middleware, an OS, or the like, for instance. As shown in FIG. 13, when the EPD update controller 210 receives the update request, as the same with step S101 in FIG. 7, the update-target region divider unit 111 of the EPD update controller 210 divides the update-target region into a plurality of sub-regions (step S101). At this time, the update-target region divider unit 111 can decide an update order of the sub-regions.

Next, the pre-process instruction unit 211 instructs a GPU, the pre-process accelerator 102, and so forth, to execute pre-process of an initial sub-region (step S201). Then, as the same with step S102 in FIG. 7, the update timing manager unit 112 configures an update start timing of each sub-region so that flashings of the sub-regions are displayed sequentially. At this time, the update timing manager unit 112 configures the update start timing of each sub-region so that update process of each sub-region is started after pre-process for each sub-region is finished. Then, the update process instruction unit 113 configures a timer (not shown) so that update of each sub-region is started at the update start timing configured by the update timing manager unit 112 (step S202). Thereby, the update processes of the sub-regions are started at the timings shifted by the time interval P.

Next, the pre-process instruction unit 211 determines whether a next sub-region to be processed exists in the update order or not (step S203), and when the next sub-region exists (step S203; YES), the pre-process instruction unit 211 instructs the GPU, the pre-process accelerator 102, and so forth, to execute pre-process (step S204). On the other hand, when the next sub-region does not exist (step S203; NO), the EPD update controller 210 directly progresses to step S205.

In step S 205, the update process instruction unit 113 confirms whether update processes for all the sub-regions are finished or not (step S205), and when the update processes are not finished (step S205; NO), the EPD update controller 202 returns to step S202. On the other hand, when the update processes for all the sub-regions are finished (step S205; YES), the EPD update controller 210 finishes the operation.

It is possible to divide pre-process so that an anterior part of the pre-process such as rendering using a GPU, or the like, is executed on an application software or a middleware, and a posterior part of the pre-process such as EPD-unique pre-process using the pre-process accelerator 102 and the EPD controller 105 is executed on the device driver 110D of the EPD controller 105, for instance. A timing chart of the pipe-line process in such case is shown in FIG. 14.

Figure 14:
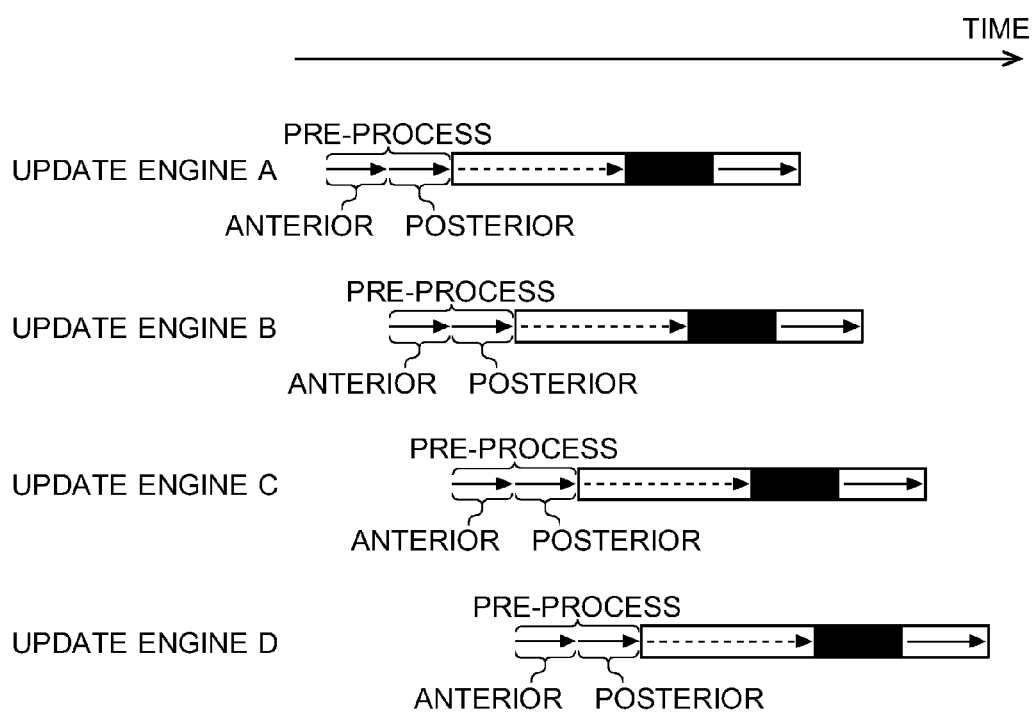
FIG. 14 is an illustration showing an example of a pipeline process according to the second embodiment.

As shown in FIG. 14, in pre-process for each sub-region, an anterior part of pre-process is executed during a term indicated by an initial solid arrow. In the anterior part of the pre-process, for instance, an application software and a middleware execute process such as rendering using a GPU, a CPU, and so forth, a result thereof is stored in a frame buffer on the main memory 12, and an update request of an update-target region is issued to a device driver of the EPD controller 105. Processes handled by the application software and the middleware are executed from the sub-region a to the sub-region d in order.

In the posterior part of the pre-process for each sub-region, for instance, the device driver of the EPD controller 105 receiving the update request executes the EPD-unique pre-process, or the like, using the pre-process accelerator 102 based on update data stored in the frame buffer of the main memory 12, and pre-processed data being a result thereof is stored in an internal buffer, or the like, of the device driver of the EPD controller 105, and then, start of updating is instructed to the EPD controller 105 with a designation of a storage area for the pre-processed data so that appearance timings of flashings of the sub-regions are shifted mutually. When the posterior part or all of the pre-process is executed by the EPD controller 105, the EPD controller 105 may execute pre-process and update process based on update data.

As described above, according to the second embodiment, because pre-process and update process are executed by each sub-region, it is possible to provide display effect capable of improving responsibility. The other structures, operations and effects can be the same as those of the above-described embodiment, and therefore, the redundant explanations thereof are omitted.

Third Embodiment

Next, a control device, a display device, a control method and a program product according to a third embodiment will be described in detail with accompanying drawings. When the EPD controller is designed to be capable of starting update process periodically, in the EPD controller, a time for starting update process arrives for every execution cycle T (from several milliseconds to several dozen milliseconds, for instance). The EPD controller 105 executes an actual update of the EPD 13 by starting update-start-ready update process of which conditions such as completion of pre-process and prepared working buffers of the EPD controller 105 are met until an end of each execution cycle T.

In a case of using such EPD controller, in order that update start timing of the EPD controller is not included in the same execution cycle, the update timing manager unit 112 should configure the time interval P as an appropriate interval. This is because if a plurality of update processes are started in the same execution cycle, flashings of these sub-regions are appeared at once.

On the other hand, if the time interval P between the update start timings of the sub-regions is too wide, there is a case where not only it becomes difficult to provide a smooth effect such as scrolling and page-flipping, but also due to expanding the total update process time of the whole update-target region, it become difficult to realize an aggressive power-saving such as powering off the SoC 10, the main memory 12 and the EPD 13, using a power-saving mode, or the like.

Figure 15:
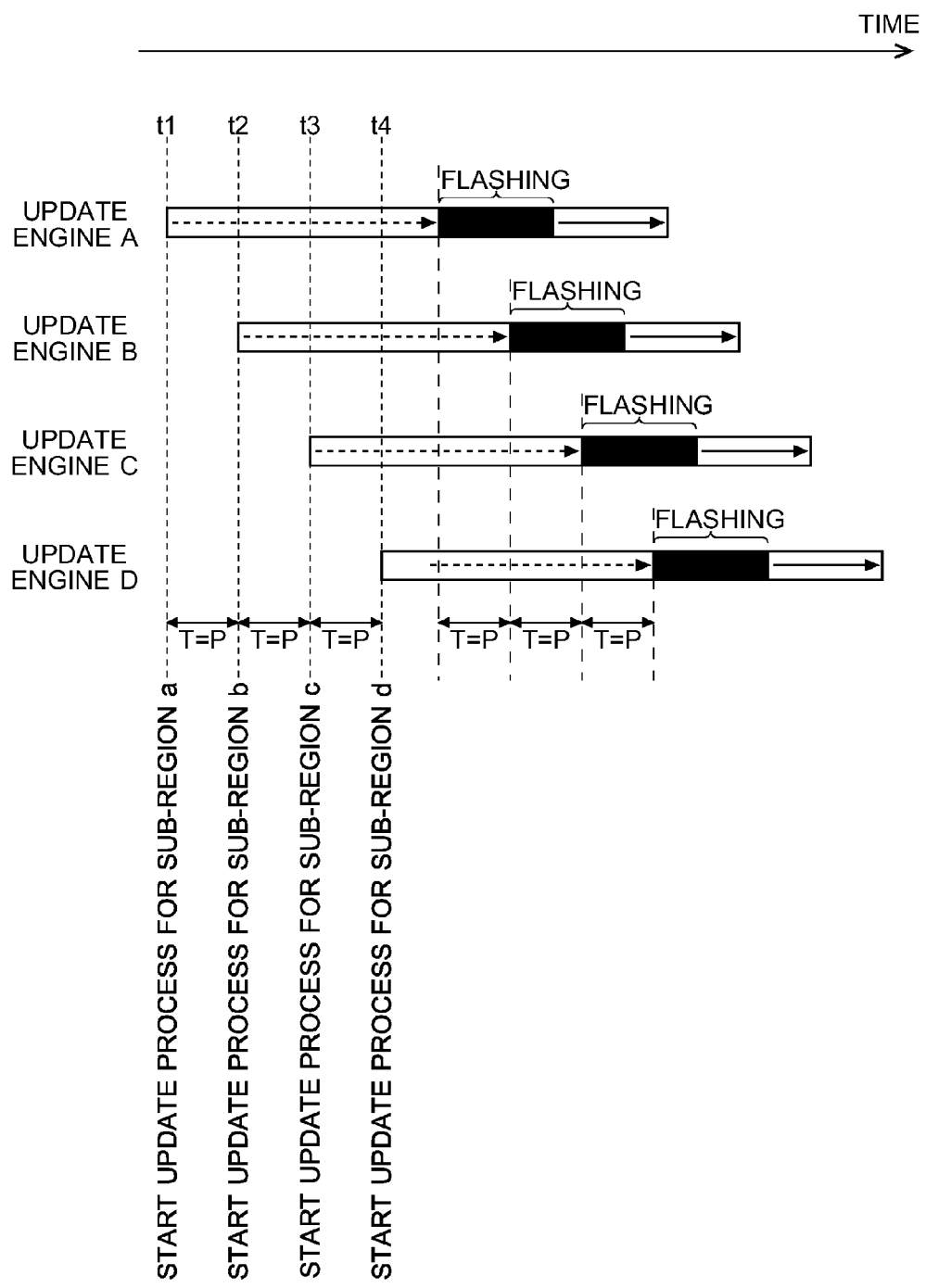
FIG. 15 is an illustration showing an example of operation timing according to a third embodiment.

In the third embodiment, as shown in FIG. 15, the update timing manager unit 112 applies the execution cycle T to the time interval P for shifting the update timing of each sub-region. In FIG. 15, times t0, t1, . . . are the end of each execution cycle T of the EPD controller 105. When the execution cycle T is applied to the time interval P, as shown in FIG. 15, one execution cycle T includes one update start timing. Thereby, because update process of each sub-region is started at a different execution cycle T of the EPD controller 105, it is possible to provide the smooth effect described above. Furthermore, because it is possible to suppress expansion of the total update process time of the whole update-target region, it is possible to execute aggressive power-saving. The time interval P does not have to be equal to the execution cycle T. The time interval P can be a multiple number of the execution cycle T, for instance.

Structures and the other operations of a data processing device according to the third embodiment can be the same as those of the above-described embodiment, and therefore, the redundant explanations thereof are omitted. Furthermore, the other effects according to the third embodiment are the same as those of the above-described embodiment, and therefore, the redundant explanations thereof are omitted, too.

Fourth Embodiment

Next, a control device, a display device, a control method and a program product according to a fourth embodiment will be described in detail with accompanying drawings. In the fourth embodiment, in the above-described embodiments, the number of the update engines capable of executing update processes in parallel in the EPD controller 105.

Here, the number of the update engines is assumed as N. N is an natural number such as 16, for instance. When N is 16, it is possible to update sixteen update-target regions (or sixteen sub-regions) in parallel. However, the division number of update-target region, i.e., the number of the sub-regions, is not limited to the number N of the update engines. This is because after releasing an update engine which is used for previous update process, this update engine can be used for remaining update processes.

For example, in a case where one update process is started in one execution cycle T of the EPD controller 105 as exampled in the third embodiment, when an update process time for a single sub-region is shorter than a term from all the update engines being assigned till all the update engines being released, the released update engine can be assigned to (N+1)th sub-region. However, due to constraint of the execution cycle T, an overlarge division number makes the total update process time of whole the update-target region long, and thereby, a time for aggressive power-saving becomes short. Therefore, the division number should be decided based on experimentations, experiences, simulation results, and so forth, with consideration of trade-off between improvement of the use experience by the effect and the power consumption.

On the other hand, a division number smaller than the number N of the update engines has some merits. That is, when the division number is set as smaller than the number N of the update engines, there is no case where update process of (N+1)th sub-region is forced to wait by releasing the update engines, and therefore, it is possible to display a smoother effect.

Figure 16:
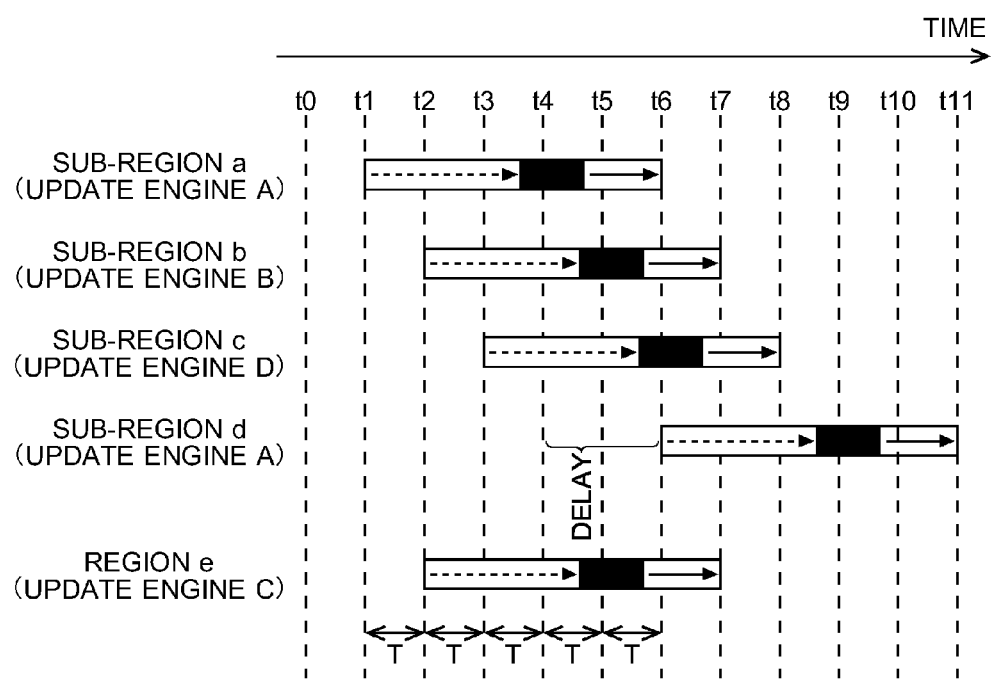
FIG. 16 is an illustration showing an example of operation timing according to a fourth embodiment.

Furthermore, there is a necessity of assuming a case where some of the update engines are used for another purpose. This case will be explained using an example shown in FIG. 16. FIG. 16 is a timing chart showing an example of operation timing of update process in a case where the number of update engines capable of using the update process is not considered. In the example shown in FIG. 16, the number of update engines is assumed as four of the update engines A to D, and the number of sub-regions being update target (i.e., the division number) is assumed as 4 of the sub-regions a to d. Furthermore, it is assumed that update request for a region e is issued except for the update-target regions of the sub-regions a to d. Moreover, it is assumed that the update start instruction of the sub-region a is issued in the execution cycle T of which time is from t0 to t1, the update start instruction of the sub-region b is issued in the execution cycle T of which time is from t1 to t2, the update start instruction of the sub-region c is issued in the execution cycle T of which time is from t2 to t3, the update start instruction of the sub-region d is issued in the execution cycle T of which time is from t3 to t4, and the update start instruction of the region e is issued in the execution cycle T of which time is from t1 to t2.

In the example shown in FIG. 16, when the update request of the region e does not exist, it is possible to assign the update engine A to the sub-region a, the update engine B to the sub-region b, the update engine C to the sub-region c, and the update engine D to the sub-region d, respectively, and therefore, each update engine A to D can start the update process at the update start timing configured by the update timing manager unit 112. As a result, it is possible to realize the smooth effect.

On the other hand, as the example shown in FIG. 16, when the update start request of the region e is issued so as to overlap with one of the update requests of the sub-regions a to d (the update request of the sub-region b, for instance), to the update process of the region e, the update engine D which is not yet assigned at this time is assigned. Therefore, to the update process of the sub-region d, until one of the update engines A to D is released, it is impossible to assign the update engine. Accordingly, the update start timing of the sub-region d is delayed till a time t6 which is after the update engine A is released. As a result, the effect appeared by updating the update-target region will be not smooth.

Figure 17:
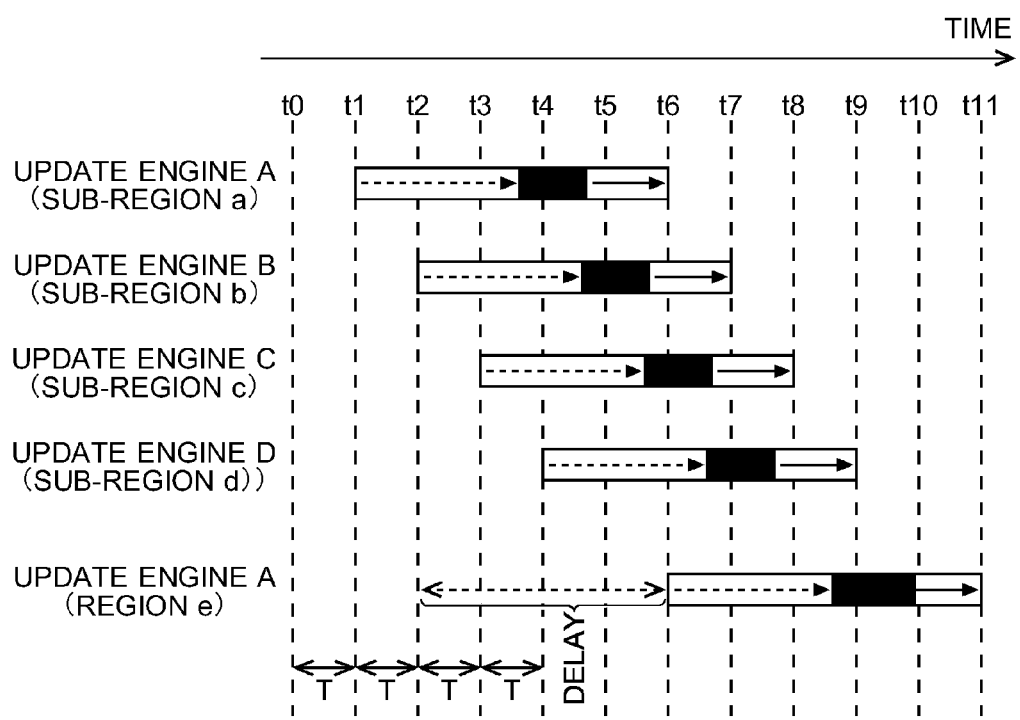
FIG. 17 is an illustration showing another example of operation timing according to the fourth embodiment.

Therefore, in the fourth embodiment, update engines with necessary quantities are secured during the successive update start instructions for the update-target region are issued. This can be realized by delay the other processes using update engines (the update process of the region e, for instance) during the successive update start instructions for the update-target region are issued, as shown in FIG. 17, for instance. Thereby, because the successive update processes for the update-target region are preferentially started, it is possible to smooth the effect appeared by updating the update-target region. To the delayed other processes (the update process of the region e, for instance), a released update engine after the assignment of the update engines to the successive update processes is finished will be assigned.

As described above, in the fourth embodiment, when it is possible to decide that there is no surplus in the number of the update engines (i.e., the number of the sub-regions or the division number) for the successive update processes, assignment of update engines to the other processes except for the successive update processes is delayed.

When the number of usable update engines is short because an update engine is assigned to another process, until update engines with a sufficient number (the number of the sub-regions or the division number, for instance) for the successive update processes (i.e., the number of the sub-regions or the division number) can be secured (or a prospect thereof can be obtained), it is possible to delay the successive update processes. Or it is also possible to dynamically change the division number depending on the number of securable update engines. In such case, in the example shown in FIG. 16, the division number is changed from 4 to 3.

It is also possible to arrange dedicated update engines for the effect. For example, it is possible to reserve four update engines among sixteen update engines as the dedicated update engines for the effect. In such case, the division number should be configured as four. According to such structure, in a case that there is a necessity to execute the update process of the region e with expeditiously, or the like, it is possible to update the region e without delay while maintaining smoothness of the effect in the update-target region.

Figure 18:
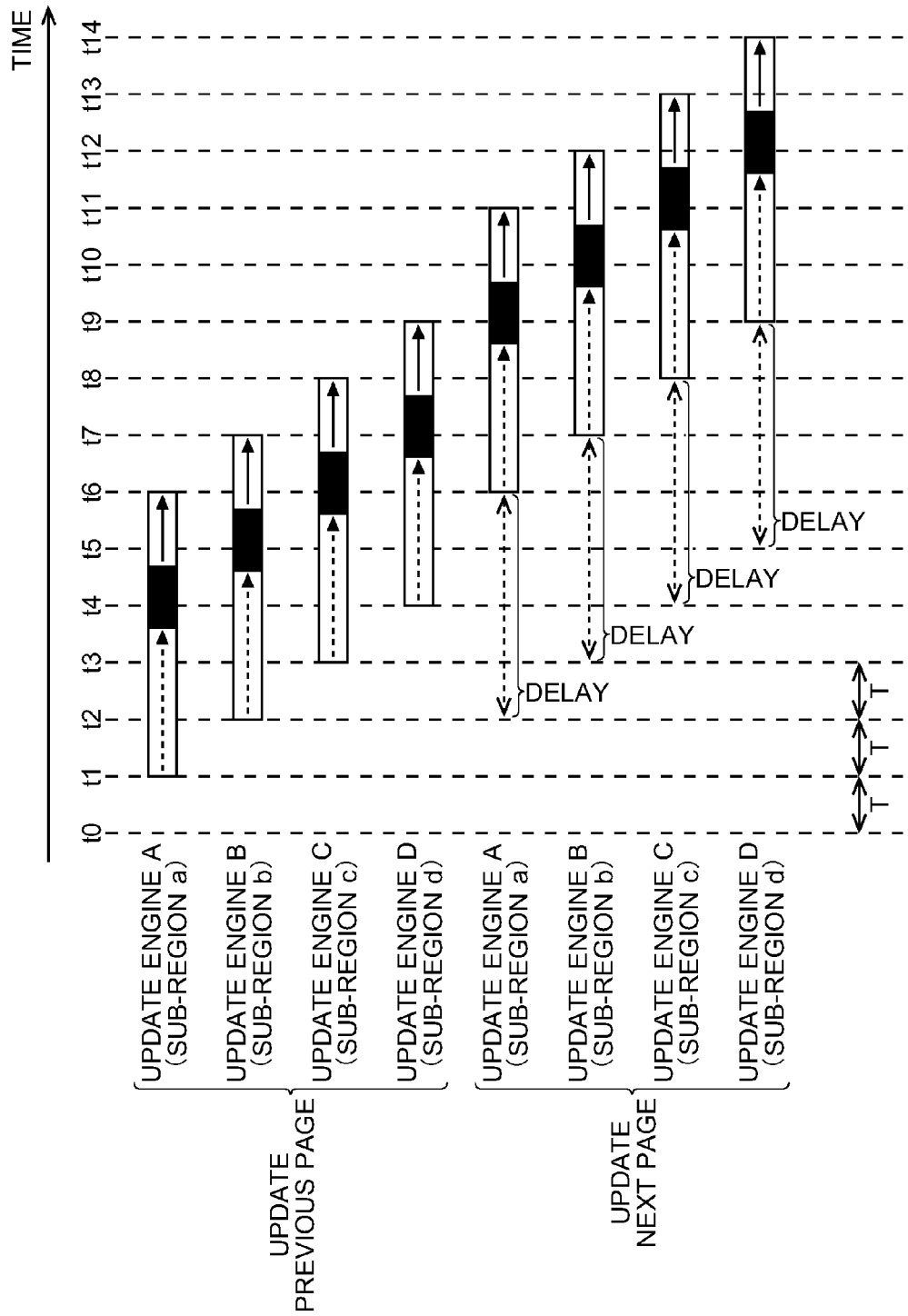
FIG. 18 is an illustration showing yet another example of operation timing according to the fourth embodiment.

When an update request for next successive update processes is issued before former successive update processes are finished, it is possible to delay assignment of the update engines to the next successive update processes till the former successive update processes are finished. An example of such case is shown in FIG. 18. In the example shown in FIG. 18, the number of the update engines is assumed as four of the engines A to D, and the division number is assumed as four. Furthermore, it is also assumed that as a former successive update processes, an update start instruction of the sub-region a is issued in the execution cycle T of which time is from t0 to t1, an update start instruction of the sub-region b is issued in the execution cycle T of which time is from t1 to t2, an update start instruction of the sub-region c is issued in the execution cycle T of which time is from t2 to t3, and an update start instruction of the sub-region d is issued in the execution cycle T of which time is from t3 to t4, and as a latter successive update processes, an update start instruction of the sub-region a is issued in the execution cycle T of which time is from t1 to t2, an update start instruction of the sub-region b is issued in the execution cycle T of which time is from t2 to t3, an update start instruction of the sub-region c is issued in the execution cycle T of which time is from t3 to t4, and an update start instruction of the sub-region d is issued in the execution cycle T of which time is from t4 to t5.

As shown in FIG. 18, when an update request for displaying a next page is issued before updates of all of the sub-regions a to d in an initial page of an update-target region such as an electronic book application have not been finished, for instance, updates of the next page is delayed. An update-target region in the former page can be the same as an update-target region in the next page. In the EPD 13, when the update-target regions are overlapped with each other, due to collision of update processes, it is impossible to start next update processes before former update processes are finished. When collision is occurred, because there is a necessity to reissue update start instructions of the collided update processes from the device driver 110D, or the like, it is impossible to start the update processes at initially-configured timings. However, as shown in FIG. 18, by delaying the update of the next page till the update of the former page is finished, it is possible to realize the smooth effect in both of the successive update processes.

When the device driver has a function of combining adjacent update processes into update process for a single region, the device driver should be configured not to combine adjacent update processes for sub-regions.

Structures and the other operations of a data processing device according to the fourth embodiment can be the same as those of the above-described embodiment, and therefore, the redundant explanations thereof are omitted. Furthermore, the other effects according to the fourth embodiment are the same as those of the above-described embodiment, and therefore, the redundant explanations thereof are omitted, too.

Fifth Embodiment

Next, a control device, a display device, a control method and a program product according to a fifth embodiment will be described in detail with accompanying drawings. In the above-described embodiments, as shown in FIG. 9, for instance, although the update start timings of the sub-regions are shifted from each other by the device driver 110D, the EPD controller 105, or the like, dividing the update-target region in response to the single update request from the application software (or middleware) 110M, it is not limited to such structure. It is also possible to structure that the application software (or middleware) 110M divides the update-target region and issues the update requests of the sub-regions to the device driver 110D.

Figure 19:
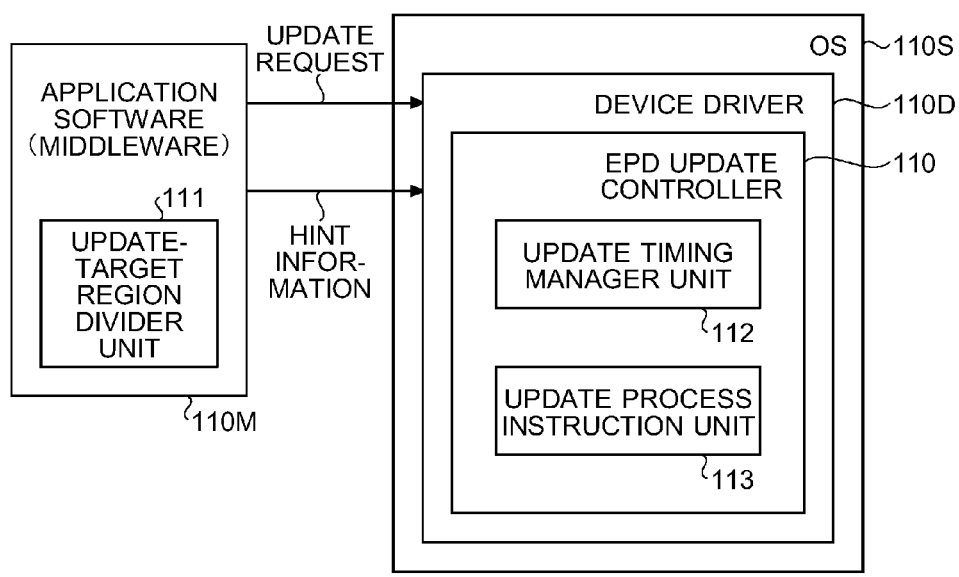
FIG. 19 is a relationship diagram of a device driver according to a fifth embodiment.
Figure 20:
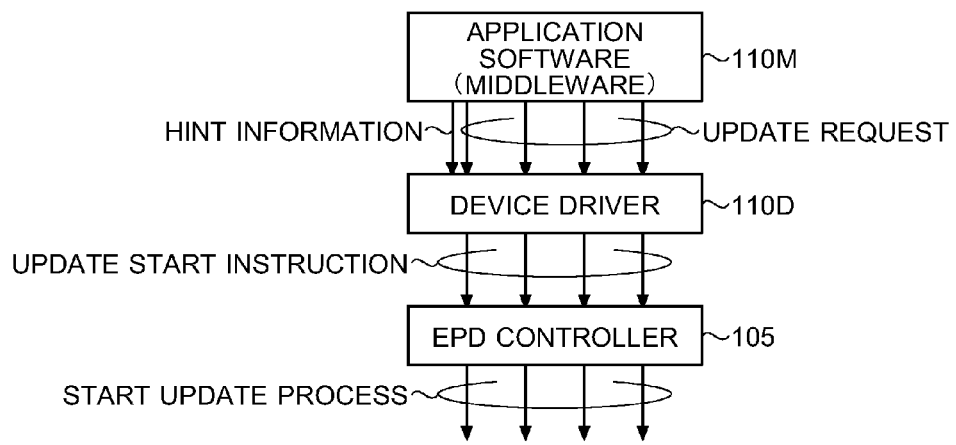
FIG. 20 is an illustration showing an operation example of the device driver according to the fifth embodiment.

FIG. 19 is an outline illustration showing a relationship between the application software (or middleware), the device driver and the EPD controller according to the fifth embodiment. FIG. 20 is a schematic diagram showing an operation example of the device driver and the EPD controller in response to update request from the application software (or middleware).

As shown in FIG. 19, in the fifth embodiment, among the structures in the EPD update controller 110 in the first embodiment (see FIG. 8), the update-target region divider unit 111 is executed as a part of functions of the application software (or middleware) 110M. The update-target region divider unit 111 on the application software (or middleware) 110M divides the update-target region. In this example, the update-target region divider unit 111 divides the update-target region into four sub-regions. The application software (or middleware) 110M issues update requests of the sub-regions created by the update-target region divider unit 111 to the device driver 110D. Therefore, in this example, the application software (or middleware) 110M issues four update requests to the device driver 110D. The device driver 110D instructs the EPD controller 105 to start update once per update request. Therefore, in this example, the device driver 110D instructs the EPD controller 105 to start update four times.

When the application software (or middleware) 110M issues the update request of the update-target region in successive issuances, the device driver 110D should figure out whether the successive update requests intend the effect, which update requests are the successive update requests, how many times the update requests continue, and so forth.

In the fifth embodiment, when the application software (or middleware) 110M transmits an initial update request (the update request of the sub-region a) to the device driver 110D, the application software (or middleware) 110M may transmit information indicating that the update request is an initial update request of an successive update requests for the effect and information for specifying after update requests as hint information in addition to the update request. The hint information may include information about the number of the after update requests (or a division number for displaying the effect), a location and/or a size of a location of the sub-regions of the after update request, and so forth, for instance, as the information for specifying the after update request. When the EPD update controller 110 receive such hint information, the update timing manager unit 112 of the EPD update controller 110 can configure appropriate update start timings. That is, even if the update requests are received from the application software (or middleware) 110M at short intervals, it is possible to instruct the EPD controller 105 to start updates with necessary time intervals P in order not to execute a plurality of update processes by the EPD controller 105 at once. Furthermore, it is also possible to delay the successive update till the update engines with necessary quantities are secured, or the like. The hint information can be informed before the initial request in the successive update request is transmitted.

When the update-target region in the EPD 13 is fixed as the electronic book application, information about application can be informed before the initial request in the successive update request is transmitted. The information about application may be an initial address of the update-target region for displaying pages and a size thereof, the division number, or the like, for instance. Furthermore, the information about application may be informed at a time of booting the application, installing the application, or the like.

As exampled in the fourth embodiment, when the update engines with the necessary quantities for the effect are reserved, the application software (or middleware) 110M may issue reservation request to the device driver 110D. By reserving the update engines with the necessary quantities for the effect, because it is possible to prevent the successive update processes from becoming periodic due to usage of the update engines by the other processes, it is possible to realize the smoother effect.

Structures and the other operations of a data processing device according to the fifth embodiment can be the same as those of the above-described embodiment, and therefore, the redundant explanations thereof are omitted. Furthermore, the other effects according to the fifth embodiment are the same as those of the above-described embodiment, and therefore, the redundant explanations thereof are omitted, too.

Sixth Embodiment

Figure 21:
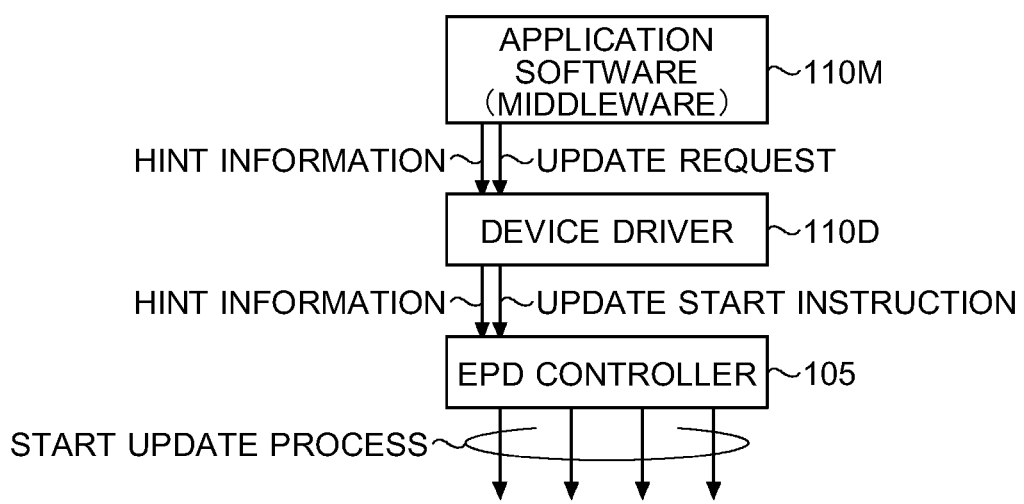
FIG. 21 is an illustration showing an operation example of a device driver according to a sixth embodiment.

Next, a control device, a display device, a control method and a program product according to a sixth embodiment will be described in detail with accompanying drawings. In the sixth embodiment, the EPD controller divides the update-target region and manages the update start timings. FIG. 21 shows an operation example of the device driver and the EPD controller in response to the update request from the application software (or middleware) according to the sixth embodiment.

As shown in FIG. 21, the application software (or middleware) 110M issues an update request of the update-target region once, the device driver 110D receiving the update request transmits one instruction of starting update to the EPD controller 105. When the EPD controller 105 receives the instruction of starting update from the device driver 110D, the EPD controller 105 divides the update-target region into the sub-regions and executes the update processes of the sub-regions while shifting the update the start timing of each update process. Here, as exampled in the third embodiment, when the EPD controller 105 execute processes in accordance with the execution cycle T, the EPD update controller 110 being a module of the EPD controller 105 can configure update start timings depending on the own execution cycle T and start update processes.

When the update start timings are configured after the update-target region is divided in the EPD controller 105, the device driver 110D and the EPD controller 105 should figure out that the update requests and the update start instructions intend the effect.

When the update request of the update-target region is transmitted to the device driver 110D, in the sixth embodiment, in addition to the update request, the application software (or middleware) 110M may transmit hint information indicating that the update requests and the update start instructions intend the effect. The hint information may be transmitted to the EPD controller 105 in addition to the update start instruction when the device driver 110D instructs the EPD controller 105 to execute update process. The EPD controller 105 determines whether the update start instruction intends the effect or not based on the hint information, and when the instruction intends the effect, the EPD controller 105 divides the update-target region into the sub-regions and configures the update start timings of the sub-regions, and then, the EPD controller 105 starts the update processes of the sub-regions according to the update start timings.

As described above, according to the sixth embodiment, because the EPD controller 105 has the function for realizing the effect, it is possible to release the device driver 110D and the application software (or middleware) 110M from complex management of update start timings. Therefore, the software according to the sixth embodiment can be easily implemented to the device.

Structures and the other operations of a data processing device according to the sixth embodiment can be the same as those of the above-described embodiment, and therefore, the redundant explanations thereof are omitted. Furthermore, the other effects according to the sixth embodiment are the same as those of the above-described embodiment, and therefore, the redundant explanations thereof are omitted, too.

Seventh Embodiment

Next, a control device, a display device, a control method and a program product according to a seventh embodiment will be described in detail with accompanying drawings. In the above-described embodiments, usage of the same kind of EPD update control information (waveform) is presupposed. When the same kind of EPD update information is used, periods of time (hereinafter referred to as delay time) from starting update processes till appearing flashings are approximately equal. Therefore, in the above-described embodiment, by shifting the update timings by the application software (or middleware) 110M, the device driver 110D or the EPD controller 105, the effect like scrolling and flipping is realized.

Figure 22:
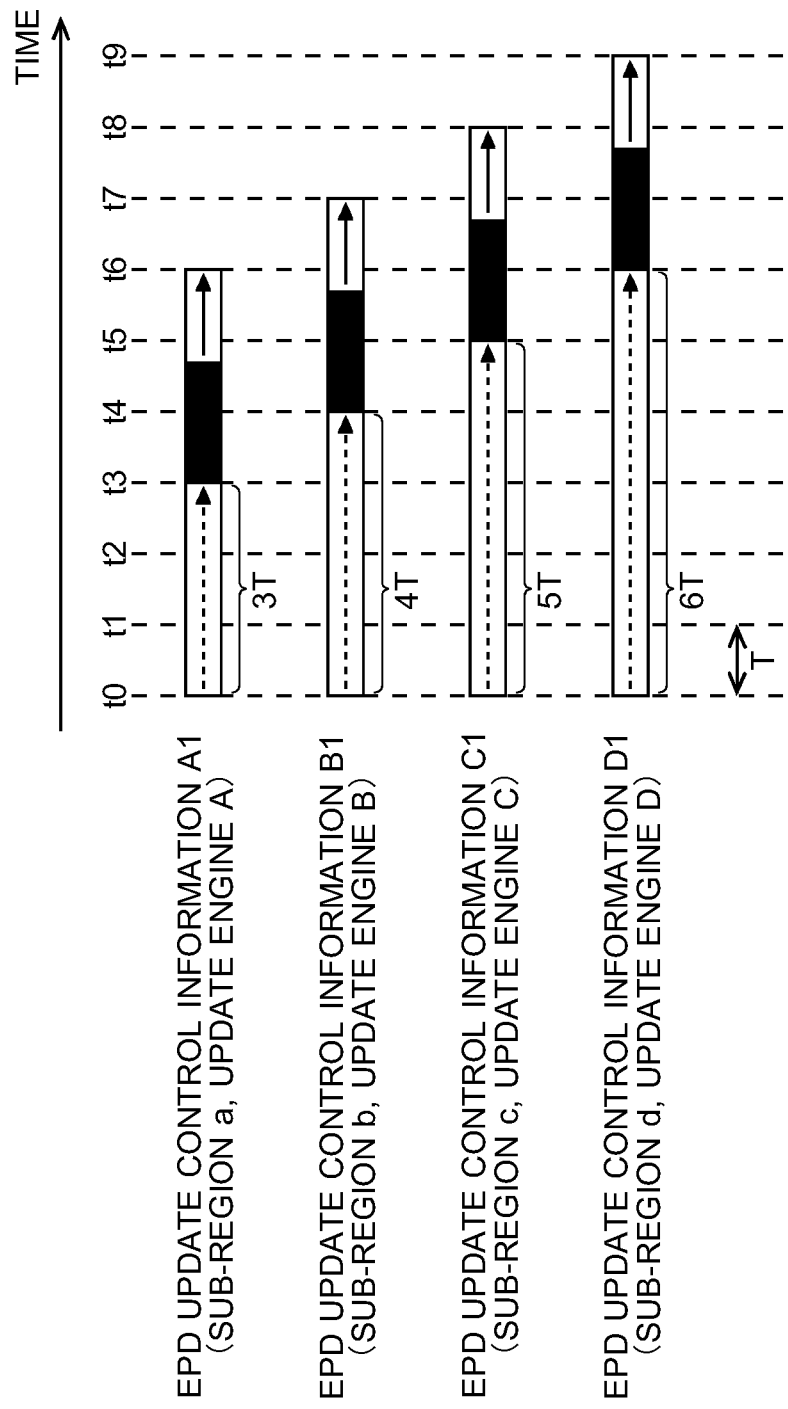
FIG. 22 is an illustration showing an example of operation timing according to a seventh embodiment.

In response, in the seventh embodiment, by using various kinds of EPD update control information of which delay times are different, the effect like scrolling and flipping is realized. FIG. 22 shows an example of an operation timing of update process in a case where various kinds of EPD update control information are used. In the example shown in FIG. 22, the number of update engines is assumed as four of the update engines A to D, and the number of sub-regions being update target (i.e., the division number) is assumed as 4 of the sub-regions a to d.

Here, it is assumed that delay times of EPD update information A1 to D1 are 3T to 6T, respectively, and the delay times are different from each other by the execution cycle T. In such case, as shown in FIG. 22, when the update engines A to D start the update processes of the sub-regions a to d at the time t0 using the different EPD update control information A1 to D1, respectively, flashings appeared on the sub-regions a to d are shifted by the execution cycle T, respectively.

When the delay times of the different kinds of the EPD update control information A1 to D1 are shifted by the time necessary for the effect (the execution cycle T, for instance), by uniforming the update start timings of the sub-regions, it is possible to realize the effect like scrolling and flipping without complex management of the update start timings.

Figure 23:
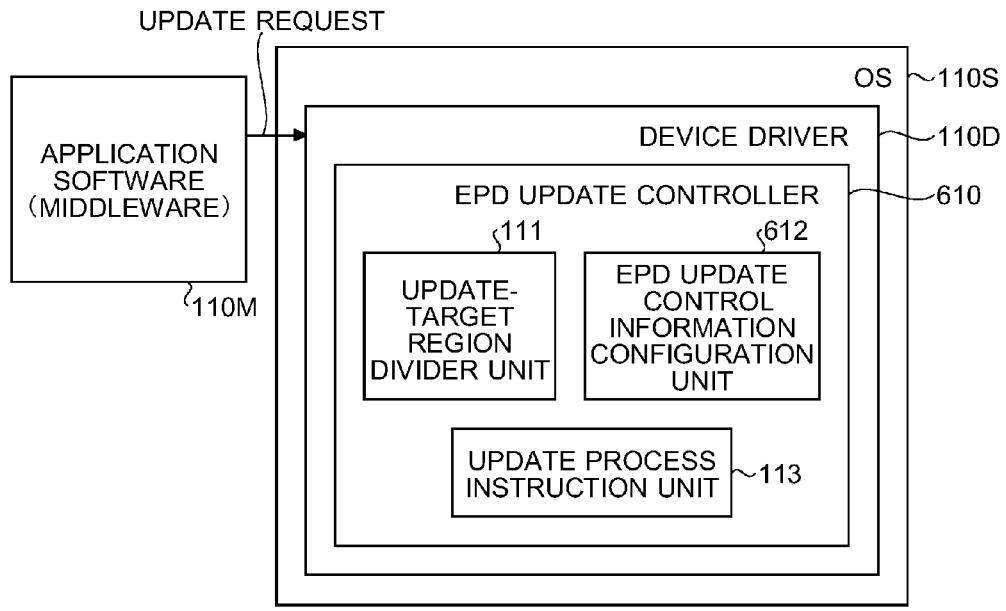
FIG. 23 is a relationship diagram of a device driver according to the seventh embodiment.
Figure 24:
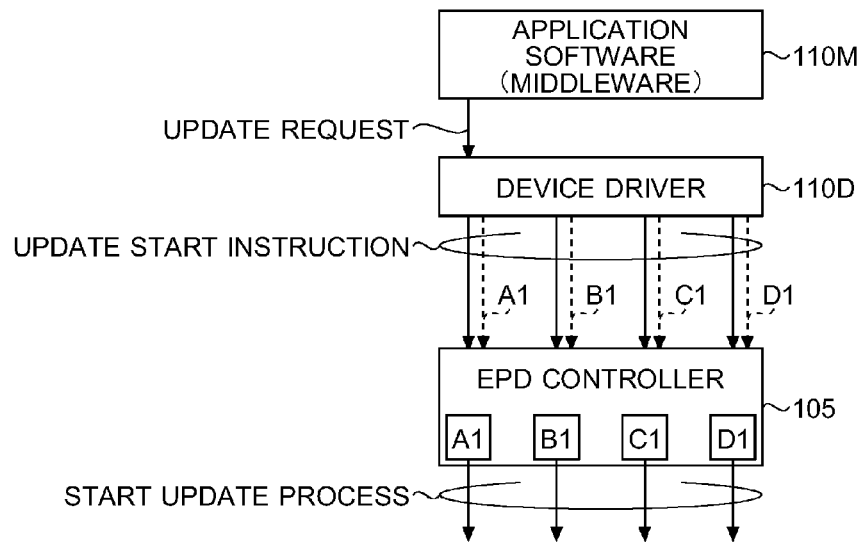
FIG. 24 is an illustration showing an operation example of the device driver according to the seventh embodiment.

FIG. 23 shows a relationship between an application software (or middleware), a device deriver and an EPD controller according to the seventh embodiment. FIG. 24 shows an operation example of the device deriver and the EPD controller in response to update request from the application software (or middleware).

As shown in FIG. 23, the seventh embodiment has the same structure with the first embodiment shown in FIG. 8, except for that the update timing manager unit 112 of the EPD update controller 110 is replaced with the EPD update control information configuration unit 612. The EPD update control information configuration unit 612 stores a plurality of pieces of EPD update control information of which delay times are different from each other in a memory (not shown), for instance. In the seventh embodiment, the EPD update controller 610 can include the pre-process instruction unit 211 shown in FIG. 12, for instance.

As shown in FIGS. 23 and 24, when the device driver 110D receives the update request for the effect from the application software (or middleware) 110M and the update-target region divider unit 111 of the EPD update controller 610 divides the update-target region into a plurality of sub-regions, the EPD update control information configuration unit 612 configures EPD update control information to be used for update processes of the sub-regions based on an preset update order. The update process instruction unit 113 of the EPD update controller 610 transmits the EPD update control information of each sub-region configured by the EPD update control information configuration unit 612 to the EPD controller 105 while transmitting the update start instructions of the sub-regions at once. In response to this, the EPD controller 105 starts the update process of each sub-region at once using the EPD update control information configured to each sub-region. As a result, flashings of the sub-region appear at the shifted timings, and the effect such as scrolling and flapping is realized.

Next, an example of update operation according to the seventh embodiment will be described in detail with FIG. 25. In an operation flow shown in FIG. 25, the same reference numbers are applied to the same steps in FIG. 7, and the redundant explanations will be omitted.

Figure 25:
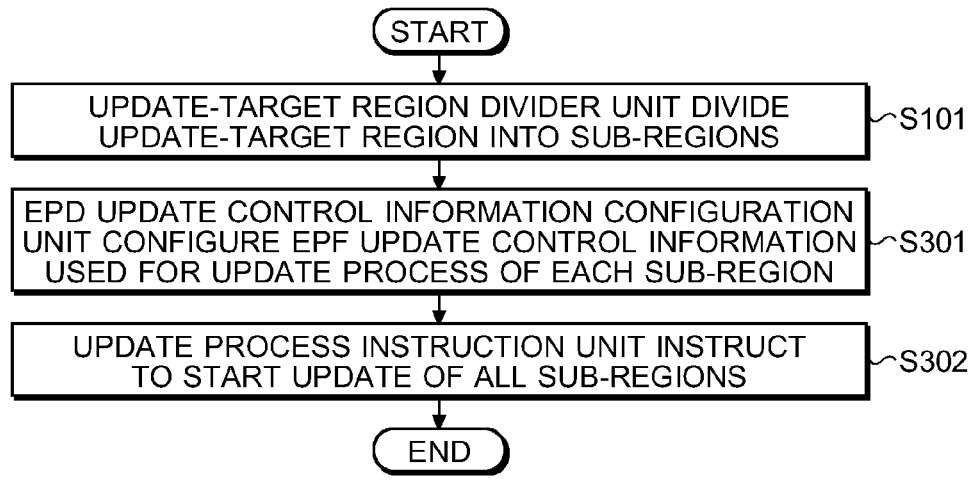
FIG. 25 is a flowchart showing an example of update operation according to the seventh embodiment.

As the operation shown in FIG. 7, the operation shown in FIG. 25 is started when update request is issued to the EPD update controller 110 from an application software, a middleware, an OS, or the like, for instance. As shown in FIG. 25, when the EPD update controller 610 receives the update request, as the same with step S101 in FIG. 7, the update-target region divider unit 111 of the EPD update controller 610 divides the update-target region into a plurality of sub-regions (step S101). At this time, the update-target region divider unit 111 can decide an update order of the sub-regions.

Then, the EPD update control information configuration unit 612 configures EPD update-control information used for update processes of the sub-regions based on the update order of the sub-regions so the flashings appears in order from an initially-updated sub-region (step S301).

Then, the update process instruction unit 113 transmits update start instructions of the sub-regions to the EPD controller 105 at once (step S301). At this time, the update process instruction unit 113 transmits the update start instructions of the sub-regions and the EPD update control information for the sub-regions configured in step S301 to the EPD controller 105. After that, the EPD update controller 610 finishes the operation.

As described above, in the seventh embodiment, because of using the various kinds of the EPD update control information of which delay times are different from each other, it is possible to realize the effect like scrolling and flipping using flashings without complex processes such as a management of the update start timings of the sub-regions.

Structures and the other operations of a data processing device according to the seventh embodiment can be the same as those of the above-described embodiment, and therefore, the redundant explanations thereof are omitted. Furthermore, the other effects according to the seventh embodiment are the same as those of the above-described embodiment, and therefore, the redundant explanations thereof are omitted, too.

Figure 26:
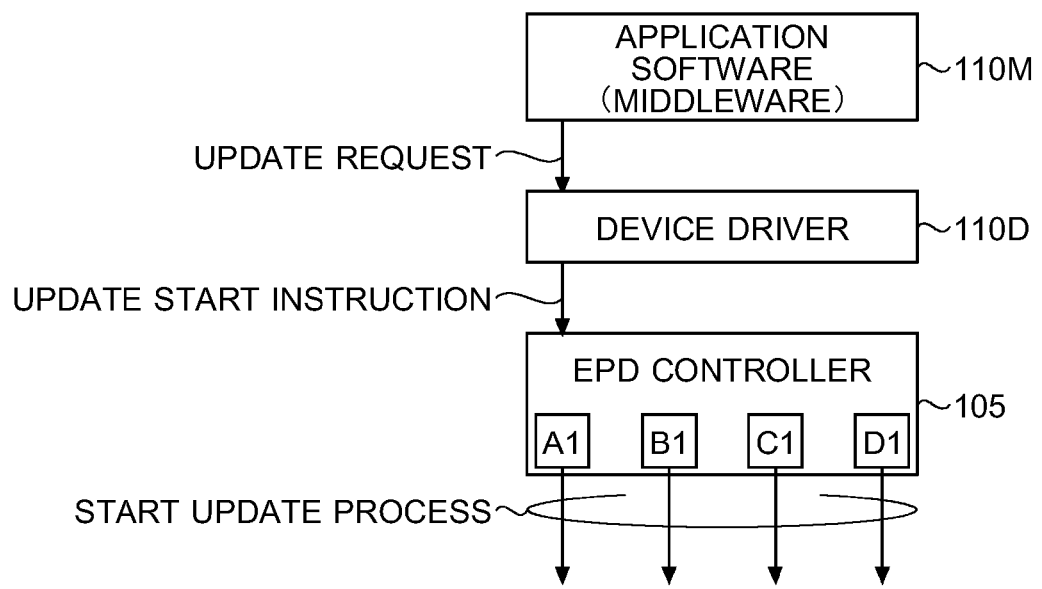
FIG. 26 is an illustration showing another operation example of the device driver according to the seventh embodiment.

Moreover, in the above-described seventh embodiment, although the EPD update control information configuration unit 612 in the EPD update controller 610 of the device driver 110D configures the EPD update control information to each sub-region, it is not limited to such manner. For example, as shown in FIG. 26, when the EPD controller 105 has a function for using various kinds of EPD update control information, instead of the EPD update control information configuration unit 612, the EPD controller may configure the EPD update control information to be used for the update processes of the sub-regions.

Eight Embodiment

In an eight embodiment, variations of a method of dividing an update-target region and an update order of the sub-regions (timings of flashing) are explained with some examples. In the following explanations, although cases where an update-target region is divided into sub-regions a to d and update processes are executed so that flashings appear at different timings are exampled, the division number is not limited to four. Furthermore, in the following explanations, a lateral direction and a longitudinal direction may be directions depending on a stance of the EPD 13, respectively.

First Example

Figure 27:
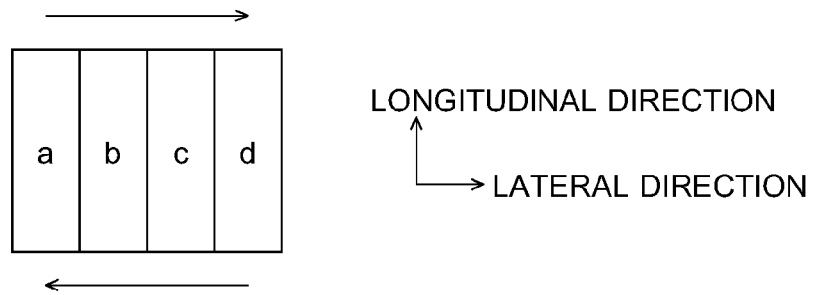
FIG. 27 is an illustration showing a division method and an update order according to a first example of an eighth embodiment.

FIG. 27 is a schematic diagram showing a division method and an update order according to a first example. In an example shown in FIG. 27, an update-target region is divided into four rectangular sub-regions a to d in a lateral direction. An update order of the sub-regions a to d may be an order from a to b to c to d in a rightward direction while the sub-region a is defined as a head, or an order from d to c to b to a in a leftward direction while the sub-region d is defined as a head.

Second Embodiment

Figure 28:
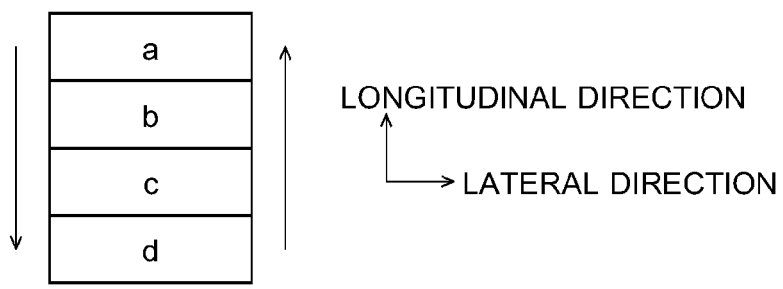
FIG. 28 is an illustration showing a division method and an update order according to a second example of the eighth embodiment.

FIG. 28 is a schematic diagram showing a division method and an update order according to a second example. In an example shown in FIG. 28, an update-target region is divided into four rectangular sub-regions a to d in a longitudinal direction. An update order of the sub-regions a to d may be an order from a to b to c to d in a downward direction while the sub-region a is defined as a head, or an order from d to c to b to a in an upward direction while the sub-region d is defined as a head.

Third and Fourth Examples

Figure 29:
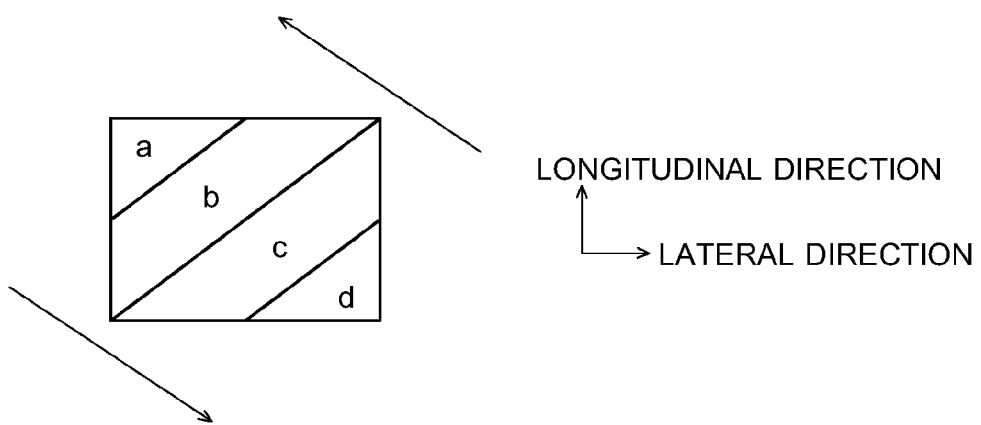
FIG. 29 is an illustration showing a division method and an update order according to a third example of the eighth embodiment.
Figure 30:
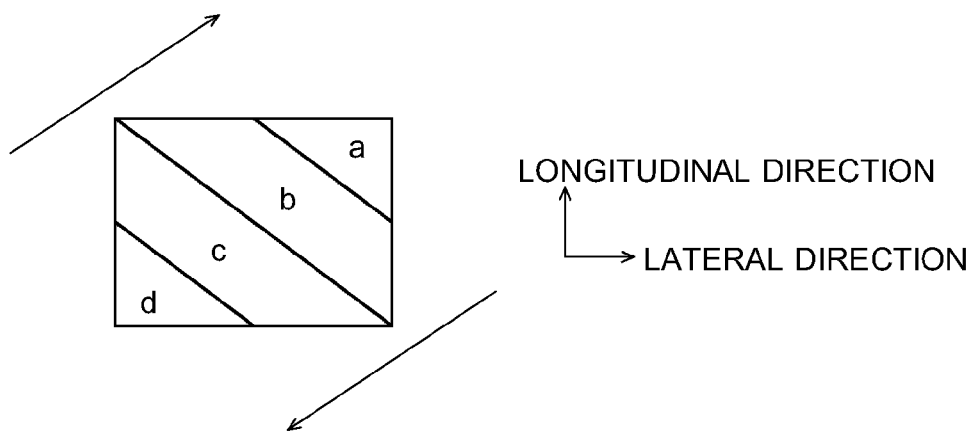
FIG. 30 is an illustration showing a division method and an update order according to a fourth example of the eighth embodiment.

FIG. 29 is a schematic diagram showing a division method and an update order according to a third example, and FIG. 30 is a schematic diagram showing a division method and an update order according to a fourth example. In examples shown in FIGS. 29 and 30, an update-target region is divided into four rectangular sub-regions a to d in a diagonal direction, respectively. An update order of the sub-regions a to d may be an order from a to b to c to d in an obliquely downward direction while the sub-region a is defined as a head, or an order from d to c to b to a in an obliquely upward direction while the sub-region d is defined as a head.

Fifth Example

Figure 31:
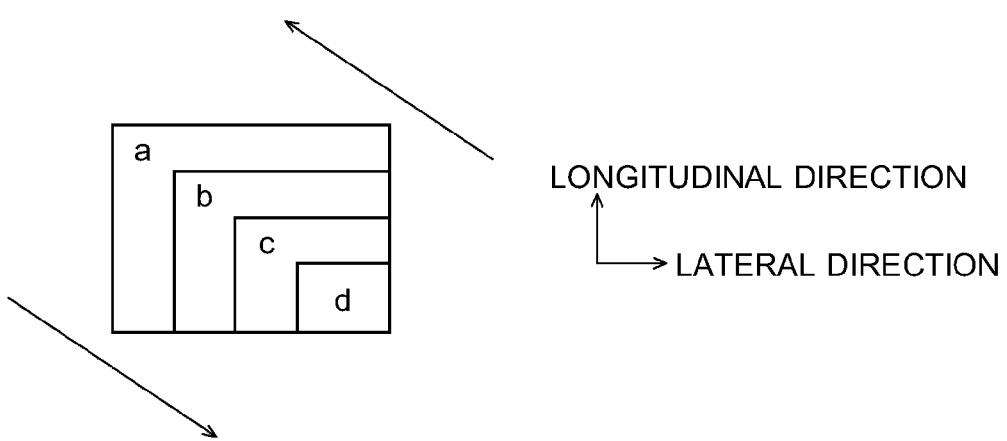
FIG. 31 is an illustration showing a division method and an update order according to a fifth example of the eighth embodiment.

FIG. 31 is a schematic diagram showing a division method and an update order according to a fifth example. In an example shown in FIG. 31, an update-target region is divided into four sub-regions a to d by borderlines formed by superimposing four homothetic rectangle regions with gradually-different sizes so that lower-right corners thereof are coincided with each other, for instance. An update order of the sub-regions a to d may be an order from a to b to c to d while the sub-region a including three corners except for the overlapped lower-right corner is defined as a head, or an order from d to c to b to a while the sub-region d including the overlapped lower-right corner is defined as a head. A point being a basis for overlapping four rectangular regions is not limited to the lower-right corner, a lower-left corner, an upper-right corner, an upper-left corner, or the like, can also be applied as the basis for overlapping four rectangular regions.

Six Example

Figure 32:
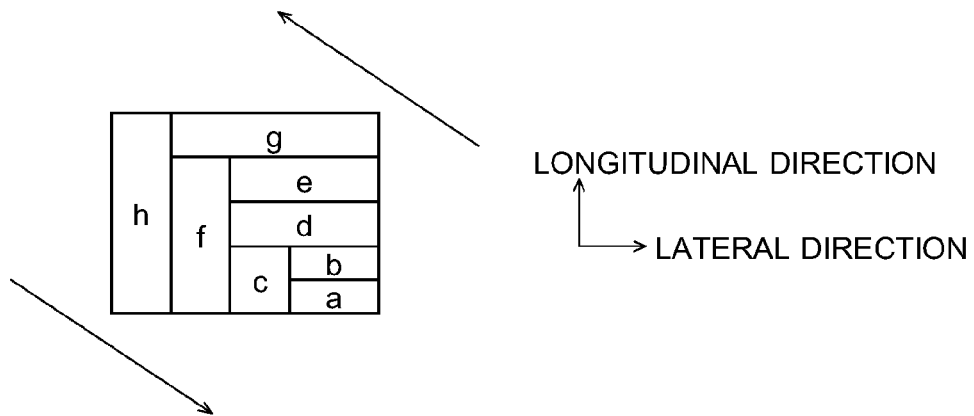
FIG. 32 is an illustration showing a division method and an update order according to a sixth example of the eighth embodiment.

FIG. 32 is a schematic diagram showing a division method and an update order according to a sixth example. As shown in FIG. 32, an update-target region may divided into a plurality of sub-regions a to h according to a certain rule. In such case, an update order of these sub-regions a to h may an order in accordance with the rule. In the example shown in FIG. 32, the update order of the sub-regions a to h may be an order from a to b to c to d to e to f to g to h while the sub-region a including a lower-right corner is defined as a head, or a reversed order thereof.

Seventh Example

Figure 33:
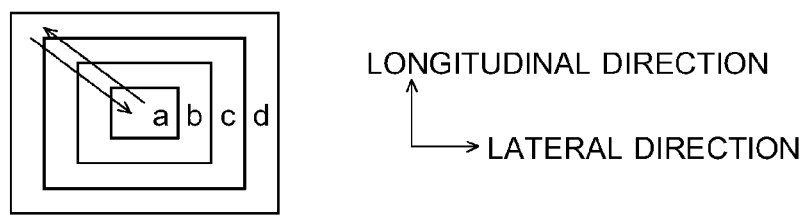
FIG. 33 is an illustration showing a division method and an update order according to a seventh example of the eighth embodiment.

FIG. 33 is a schematic diagram showing a division method and an update order according to a seventh example. In an example shown in FIG. 33, an update-target region is divided into four sub-regions a to d by borderlines formed by superimposing four homothetic rectangle regions with gradually-different sizes so that center thereof are coincided with each other, for instance. An update order of the sub-regions a to d may be an order from a to b to c to d while the sub-region a including the center corner is defined as a head, or an order from d to c to b to a while the outer sub-region d is defined as a head. A point being a basis for overlapping four rectangular regions is not limited to the center, a point shifted from the center can also be applied as the basis for overlapping four rectangular regions.

Eight Example

Figure 34:
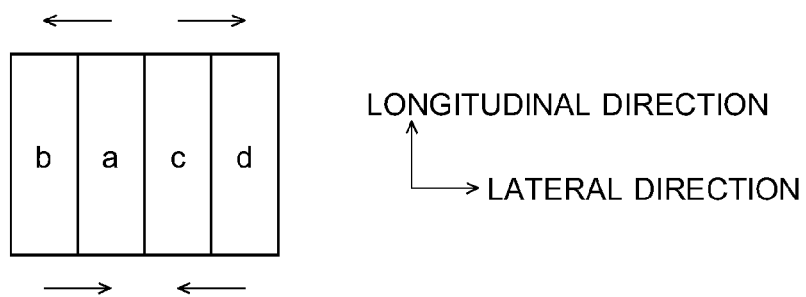
FIG. 34 is an illustration showing a division method and an update order according to an eighth example of the eighth embodiment.

FIG. 34 is a schematic diagram showing a division method and an update order according to an eight example. In an example shown in FIG. 34, an update-target region is divided into four rectangular sub-regions a to d in a lateral direction. An update order of the sub-regions a to d may be, as a motion of opening a pair of doors, an order from a to b in a leftward direction and an order from c to d in a rightward direction while the near-central sub-regions a and c are defined as heads, respectively, or as a motion of closing a pair of doors, orders from b to a and from d to c in directions toward a center while the outer sub-regions b and d are defined as heads. Thus, the update order does not have to depend on an arraignment of the sub-regions, arbitrary orders can be applied to the update order. Furthermore, there is no necessity of starting update process one by one in series, and for instance, as the example shown in FIG. 34, the update processes of a plurality of the sub-regions a and c or the sub-regions b and d can be started at once.

Ninth Example

Figure 35:
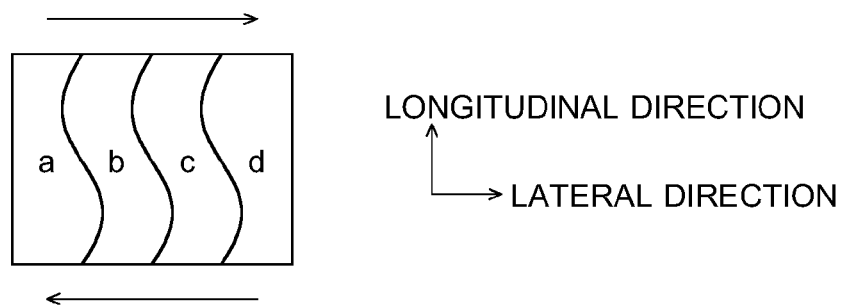
FIG. 35 is an illustration showing a division method and an update order according to a ninth example of the eighth embodiment.

FIG. 35 is a schematic diagram showing a division method and an update order according to a ninth example. In an example shown in FIG. 34, an update-target region is divided into four sub-regions a to d in a lateral direction. Division lines of the sub-regions a to d are wavy lines and not straight lines. That is, a shape of each sub-region can be a shape except of a rectangular region. An update order in the example shown in FIG. 35 may be an order from a to b to c to d in a rightward direction while the sub-region a is defined as a head, or an order from d to c to b to a in a leftward direction while the sub-region d is defined as a head.

Tenth Example

Figure 36:
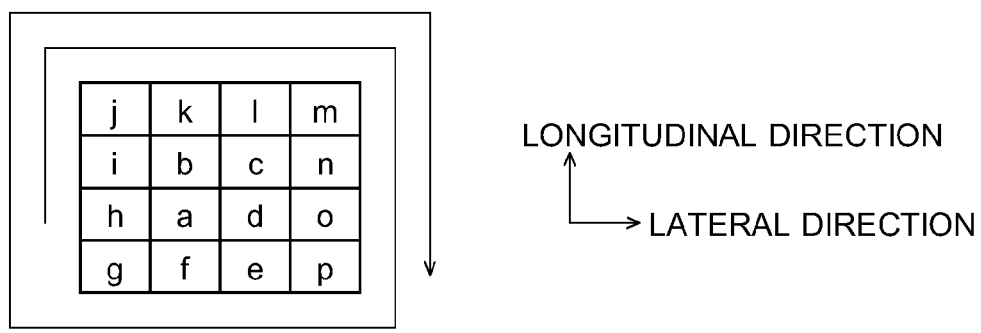
FIG. 36 is an illustration showing a division method and an update order according to a tenth example of the eighth embodiment.

FIG. 36 is a schematic diagram showing a division method and an update order according to a tenth example. In an example shown in FIG. 36, an update-target region is divided into sixteen rectangular sub-regions a to p in a reticular pattern. Thus, the update-target region can be divided into sub-regions having a multidirectional order, and not a single directional order. In such case, to the update order of the sub-regions, it is possible to apply various rules. In the example shown in FIG. 36, the update order of the sub-regions a to p may be an order from a to b to c to d to e to f to g to h to i to j to k to l to m to n to o to p in a spiral manner while the near-central sub-region a is defined as a head, or a reversed order thereof. Furthermore, another order can be applied to the update order.

Figure 37:
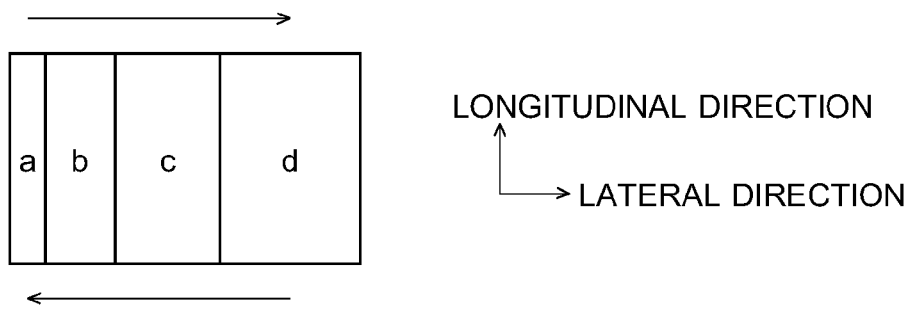
FIG. 37 is an illustration showing a case of dividing into unequal areas in the eighth embodiment.

In the first to tenth examples described above, although the update-target region is divided into the sub-regions with even area, the update-target region can be divided into sub-regions with uneven area. An example thereof is shown in FIG. 37. For example, by dividing an update-target region and arranging an update order so that an areas of one flashing expands gradually, it is possible to making the scrolling seem to accelerate. Conversely, by arranging the update order so that an areas of one flashing downsize gradually, it is possible to making the scrolling seem to deaccelerate. As another method for making the scrolling seem to accelerate or deaccelerate in a case where the update-target region is divided into even areas, there is a method of increasing or decreasing a time interval of updating gradually. When the sub-regions, are not rectangular regions and the EPD controller 105 does not have a function for updating non-rectangular regions, it is applicable that the non-rectangular sub-regions are divided into rectangular regions and update processes of the rectangular regions are executed. In such case, update engines are assigned to the rectangular regions divided from the non-rectangular sub-regions.

The division methods and the update orders explained using FIGS. 27 to 37 are just random examples in this explanation. Therefore, the division method and the update order of an update-target region is not limited to the above-explained examples, and various kinds of division methods and update orders can be applied. For example, an update-target region can be divided into a checkered pattern. Furthermore, a random update order can be applied, for instance.

The division method and the update order are not required to be fixed for each update-target region, and they can be dynamically changed. That is, the division method and the update order can be changed at every update request, and it is also possible that the division method and the update order are changed at random or depending on certain conditions.

Among the above-described examples, the first to fourth examples are suitable for viewers, readers, browsers, or the like, for browsing electronic books, texts, pictures, information in SNS (social networking service). The third to seventh example are suitable for applications for illustrations, maps, spreadsheets, or the like. Especially, the seventh example can be used for expanding and downsizing by these applications. For example, the order shown in FIG. 33 in which the sub-region a is defined as the head may be used as an update order for expanding, and a reversed order thereof may be used an update order for downsizing. Furthermore, the seventh example can use the order shown in FIG. 33 in which the sub-region a is defined as the head as an update order for switching from a menu screen at a time of booting application to an application screen, and use the reversed order as an update order for switching from the application screen at a time of terminating the application to the menu screen.

The third and fourth examples can be used for moving a displayed area in an oblique direction in maps, spreadsheets, or the like, for instance. The eight and ninth examples can be used for presentation applications, or the like, for instance. The tenth example can be used for authentication of the data processing device; in which the device may be authenticated by tracing whole or a part of a sixteen-divided screen unicursally in an order preset in a system except of the update order in which the sub-region a is defined as the head and the reversed update order thereof. Usages of the examples are not limited to these cases, and the examples can be used in various kinds of applications.

Ninth Embodiment

Next, a control device, a display device, a control method and a program product according to a ninth embodiment will be described in detail with accompanying drawings. In the ninth embodiment, depending on contents to be displayed and user operations, the division method of an update-target region and the update order of sub-regions are changed.

Figure 38:
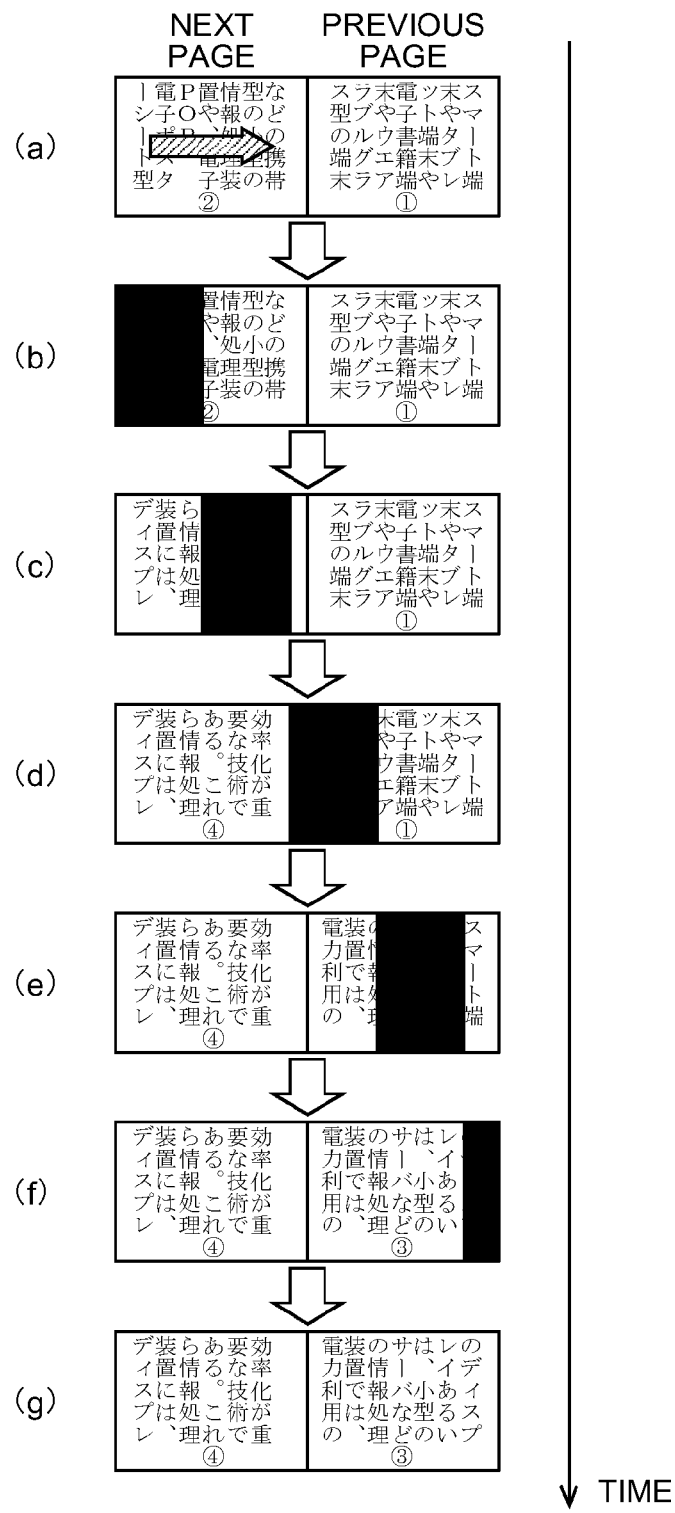
FIG. 38 is an illustration showing an example of update operation according to the ninth embodiment.
Figure 39:
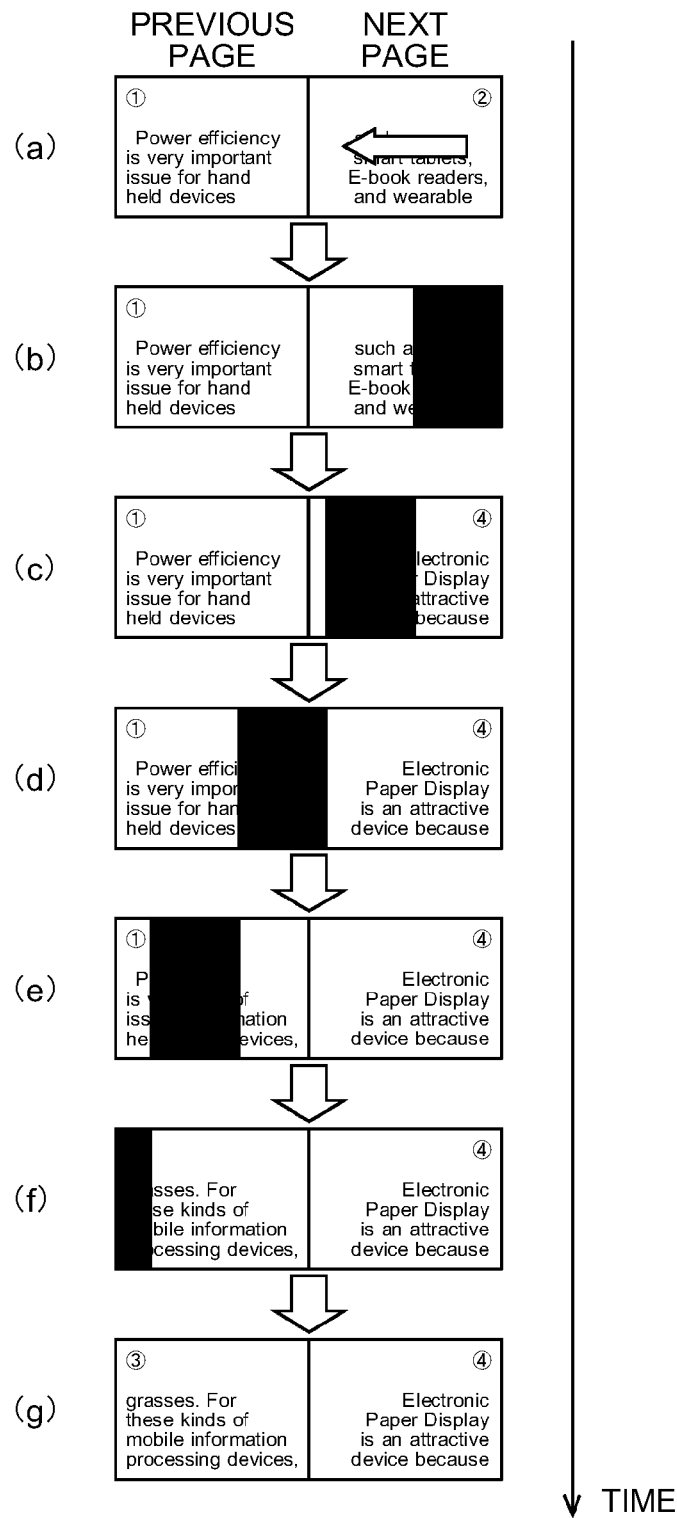
FIG. 39 is an illustration showing another example of update operation according to the ninth embodiment.

FIG. 38 is an illustration showing an example of update operation in a case where flapping operation of pages is inputted from a user with respect to displayed facing pages of a vertical book such as a Japanese book. FIG. 39 is an illustration showing an example of update operation in a case where flapping operation of pages is inputted from a user with respect to displayed facing pages of a horizontal book such as a Western book.

When a vertical book such as a Japanese book is displayed as facing pages, in an actual book, a next page can be seen by flipping a left-hand page in the facing pages (next page in (a) of FIG. 38). In the ninth embodiment, such flipping operation of pages is represented using the effect. In the ninth embodiment, when a user touch-inputs somewhere or a specific part on the next page in (a) of FIG. 38 using the touch-screen input device 14, as shown in (b) to (f) of FIG. 38, update processes with the effect in which a black band by flashing moves in a rightward direction from the extreme left on the facing pages are executed. Thereby, because an image of the next page appears a part where the black band is passed though, it is possible to represent a motion of flipping a page of an actual book by a movement of the black band by flashing. It is possible to display a button on a specific portion on the next page as a user interface for inputting operation of flipping pages.

When a user touch-inputs somewhere or a specific part on the previous page in (a) of FIG. 38 using the touch-screen input device 14, because update processes with the effect in which the black band moves in a leftward direction from the extreme right, a motion of back-flipping a page of an actual book (this is page flipping, too) by a movement of the black band by flashing. It is possible to display a button on a specific portion on the previous page as a user interface for inputting operation of back-flipping pages.

When a user inputs an operation shown by an arrow in (a) of FIG. 38, which is so called as flick, swipe, or the like, in which a portion contacted by a pen or a finger are slid using the touch-screen input device 14, by making a displayed image move by executing update processes with the effect in which the black band moves in the same direction with the operation direction (direction of the arrow), it is possible to represent a motion like scrolling.

However, this is a just random example, it is possible to combine arbitrary division method and update order with a user operation. Furthermore, the direction of the user operation such as flick, swipe, or the like, can be opposite to the direction of the movement of the black band. In such case, the black band by flashing moves along a reading direction.

As shown in FIG. 39, also in the case of the horizontal book such as a Western book, by the same update operation as the operation in the case of the vertical book explained above using FIG. 38, it is possible to represent a motion like flipping pages and scrolling.

The displays of facing pages exampled in FIGS. 38 and 39 are just random examples, and in a general electronic book reader, or the like, without facing pages, it is also possible to represent a motion like flipping pages and scrolling by the same operation. Furthermore, also in a case of spreadsheets, maps, or the like, when an area displayed on a screen is shifted by an operation such as flick, swipe, or the like, it is also possible to represent a motion like flipping pages and scrolling by the same operation.

Figure 40:
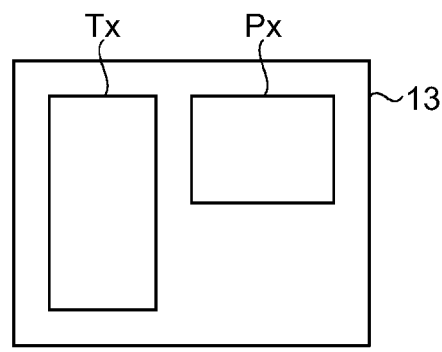
FIG. 40 is an explanatory diagram for a case where text and picture are displayed at one time according to the ninth embodiment.

As shown in FIG. 40, for instance, when a text Tx and a picture Px are displayed on the EPD 13, it is possible to control update operations so that the text Tx is updated after the picture Px is update, or the picture Px is update after the text Tx is update, even if the text Tx and the picture Px can be updated at once. By controlling the update operation according to such manner, it is possible to update an image to be focused by a user or on which a user will focus using the effect by flashing. Moreover, by showing the effect by flashing, it is possible to notice changes of contexts to a user implicitly, and it is also possible to lead a user to browse a screen in order of appearance of flashing.

Figure 41:
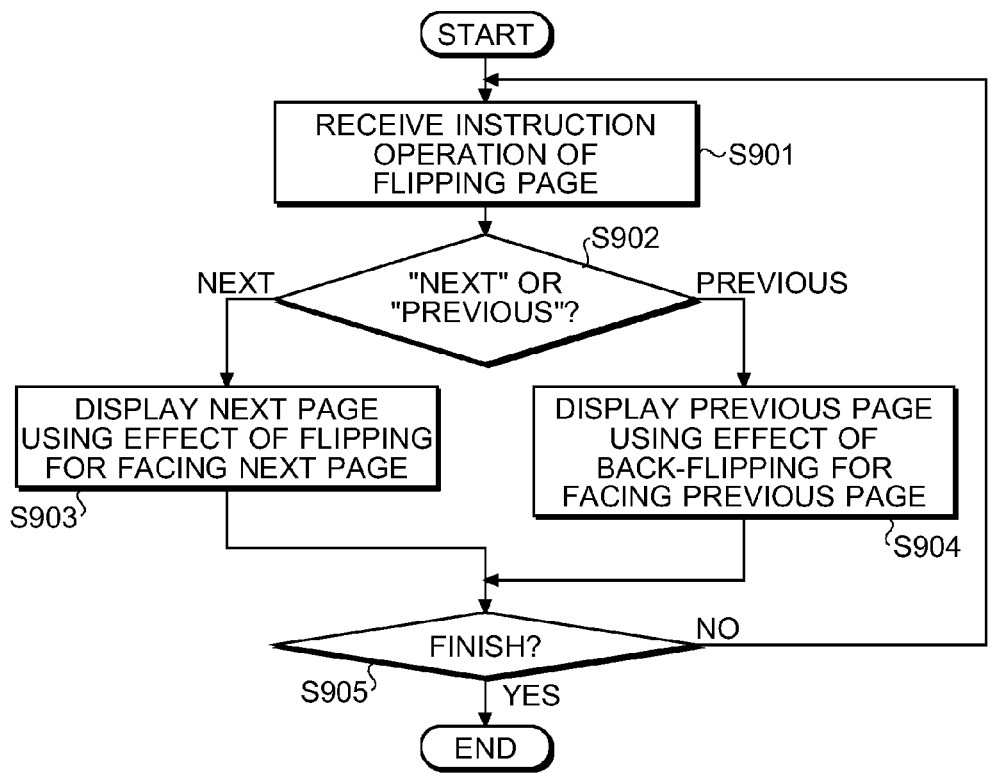
FIG. 41 is a flowchart showing an example of the update operation according to the ninth embodiment.

Next, an example of update operation depending on a user operation according to the ninth embodiment will be described in detail with FIG. 41. In FIG. 41, an operation of the application software (or middleware) 110M is focused.

As shown in FIG. 41, when an instruction operation of flipping, pages is inputted from a user using the input device 14 (step S901), the application software (or middleware) 110M determines whether the inputted instruction operation is an operation for flipping for facing a next page or an operation for facing a previous page (step S902).

As a result of the determination of step S902, when the inputted instruction operation is the operation for flipping for facing the next page (step S902; NEXT), the application software (or middleware) 110M displays the next page on the EPD 13 using the effect of flipping for facing the next page by issuing update request for realizing the effect of flipping for facing the next page to the device driver 110D (step S903). On the other hand, as the result of the determination of step S902, when the inputted instruction operation is the operation for flipping for facing the previous page (step S902; PREVIOUS), the application software (or middleware) 110M displays the previous page on the EPD 13 using the effect of back-flipping for facing the previous page by issuing update request for realizing the effect of back-flipping for facing the previous page to the device driver 110D (step S904).

After that, the application software (or middleware) 110M determine whether the operation should be finished or not (step S905), and when the operation should be finished (step S905; YES), the application software (or middleware) 110M finishes the operation. On the other hand, when the operation should not be finished (step S905; NO), the application software (or middleware) 110M returns to step S901.

As described above, according to the ninth embodiment, because the update processes are executed so that the movement of the black band (i.e., the update order of the sub-regions) is controlled depending on the user operation, it is possible to realize the effects depending on various kinds of operation inputs. In addition, in applications of a digital signage, an electronic poster, or the like, not only depending on the user operations, but also it is possible to execute divided updating at regular intervals using a timer.

Structures and the other operations of a data processing device according to the ninth embodiment can be the same as those of the above-described embodiment, and therefore, the redundant explanations thereof are omitted. Furthermore, the other effects according to the ninth embodiment are the same as those of the above-described embodiment, and therefore, the redundant explanations thereof are omitted, too.

Tenth Embodiment

As for a update method (or updating mode) of EPD, in addition to the method associated with flashing for remaining no afterimage explained in the above-described embodiments, there are various kinds of update methods such as a method in which update speed is fast as much as some afterimages of updated contents are remained, or the like.

In order to clear afterimages stacked up by an update method without flashing, it is possible to consider a method in which one for every several updating without flashing is replaced with updating with flashing. For example, an update process with flashing is executed after every ten update processes without flashing are executed.

The update method according to the above-described embodiments can be applied to a non-volatile display, a low-power display with low refresh rate, or the like. Furthermore, as the EPD 13 according to the above-described embodiments, not only a grayscale EPD, but also a color EPD can be applied.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control device capable of controlling update of a target region in an electronic paper, the device comprising:
    a divider unit configured to divide the target region into a plurality of sub-regions;
    a manager unit configured to set an update start timing of each sub-region so that flashings occurring at updating of the sub-regions appear at different timings; and
    an update instruction unit configured to instruct to execute an update process of each sub-region according to the update start timings, wherein
    the update instruction unit instructs a controller configured to execute update processes of the sub-regions to execute the update processes,
    the controller executes the update processes according to a preset execution cycle, and
    the manager unit configures the update start timing of each sub-region so that initiations of the update processes of the sub-regions are included in execution cycles that are different from each other.

2. The device according to claim 1, wherein the manager unit specifies an update order of the sub-regions and sets the update start timing of each sub-region so that the flashings occurring at updating of the sub-regions appear at the different timings.

3. The device according to claim 1, further comprising a pre-process instruction unit configured to instruct a pre-process for every sub-regions,
    wherein the target regions is divided into the plurality of the sub-regions including at least a first sub-region and a second sub-region, and
    the update instruction unit instructs to execute a pre-process of the second sub-region so that the pre-process of the second sub-region is executing while an update process of the first sub-region is executing.

4. The device according to claim 1, wherein the update instruction unit instructs a controller having a plurality of update modules each of which is configured to execute an update process of each sub-region, and reserves update modules with the same number as a division number of the target region in the divider unit.

5. The device according to claim 1, wherein
    the target region is divided into the plurality of sub-regions including at least a first sub-region and a second sub-region,
    the update instruction unit instructs a controller having a plurality of update modules including at least a first update module and a second update module, each of the first update module and the second update module being configured to execute an update process of one of the sub-regions, to execute the update processes,
    the first update module executes an update process of the first sub-region, and
    the second update module executes an update process of the second sub-region.

6. The device according to claim 1, wherein the update instruction unit instructs a controller having a plurality of update modules each of which is configured to execute an update process of each sub-region, and when it is impossible to reserve update modules with the same number as a division number of the target region in the divider unit, till it become possible to reserve the update modules with the same number as the division number, delays the instructions of the update processes of the sub-regions.

7. The device according to claim 1, wherein an execution of the update process of a second target region is delayed so that a smooth effect occurs due to the flashings, the second target region being a region other than a sequence of update processes, in which a first target region is divided into the plurality of sub-regions and updated.

8. The device according to claim 1, wherein the manager unit sets the update start timing of each sub-region so that an update process period of an entire target region is refrained from being elongated and sets the device to a low power consumption mode after the update process of a last sub-region is finished.

9. A control device capable of controlling update of a target region in an electronic paper, the device comprising:
- a divider unit configured to divide the target region into a plurality of sub-regions;
- a manager unit configured to set an update start timing of each sub-region so that flashings occurring at updating of the sub-regions appear at different timings; and
- an update instruction unit configured to instruct to execute an update process of each sub-region according to the update start timings, wherein
- the update instruction unit instructs a controller having a plurality of update modules each of which is configured to execute an update process of each sub-region, and
- the divider unit divides the target region into the sub-regions of which number is equal to or smaller than the number of update modules capable of being used by the controller.

10. A control device capable of controlling update of a target region in an electronic paper, the device comprising:
- a divider unit configured to divide the target region into a plurality of sub-regions;
- a manager unit configured to set an update start timing of each sub-region so that flashings occurring at updating of the sub-regions appear at different timings; and
- an update instruction unit configured to instruct to execute an update process of each sub-region according to the update start timings, wherein
- when update requests of first and second target regions of which at least parts are overlapped with each other are overlapped,
- the divider unit divides the first target region into a plurality of first sub-regions in response to a former update request, and divides the second target region into a plurality of second sub-regions in response to a latter update request, and
- the manager unit configures an update start timing of a second sub-region of which at least a part is overlapped with at least one of the first sub-regions so that an update process of the second sub-region of which at least the part is overlapped with the at least one of the first sub-regions is started after an update process of the at least one of the first sub-regions is finished.

11. A display device configured to update, when an operation for sliding a target region in an electric paper, the target region including a plurality of sub-regions, is inputted using a touch-screen input device, the sub-regions of the target region in order, wherein
- the display device executes the update process in a predetermined execution cycle, and updates so that initiations of the update processes of the sub-regions are included in execution cycles that are different from each other.

12. A control device instructing an update process of a target region to a controller for controlling update of the target region in an electronic paper based on update control information set in advance, the device comprising:
- a divider unit configured to divide the target region into a plurality of sub-regions;
- a manager unit configured to set the update control information used for the update process of each sub-region; and
- an update instruction unit configured to instruct to execute the update process of each sub-region according to the update control information set by the manager unit, wherein
- the update control information includes plural pieces of the update control information having different time periods from an update start to a display of flashings, and
- the manager unit sets the update control information used for the update process of each sub-region so that flashings occurring at updating of the sub-regions are displayed at different timings.

* * * * *